United States Patent
Kanno

(10) Patent No.: US 9,053,862 B2
(45) Date of Patent: Jun. 9, 2015

(54) VARIABLE CAPACITANCE DEVICE WITH A PLURALITY OF ELECTRODES LAMINATED VIA DIELECTRIC LAYERS

(75) Inventor: Masayoshi Kanno, Kanagawa (JP)

(73) Assignee: DEXERIALS CORPORATION, Tokyo (JP)

( * ) Notice: Subject to any disclaimer, the term of this patent is extended or adjusted under 35 U.S.C. 154(b) by 14 days.

(21) Appl. No.: 12/944,984

(22) Filed: Nov. 12, 2010

(65) Prior Publication Data
US 2011/0134582 A1    Jun. 9, 2011

(30) Foreign Application Priority Data
Dec. 3, 2009    (JP) ............................. P2009-275885

(51) Int. Cl.
H01G 7/06    (2006.01)

(52) U.S. Cl.
CPC ........................ *H01G 7/06* (2013.01)

(58) Field of Classification Search
CPC ............ H01G 7/06; H01G 7/00; H01G 7/026
USPC ....................... 361/277, 280, 281
See application file for complete search history.

(56) References Cited

U.S. PATENT DOCUMENTS

| 3,569,795 | A  | * | 3/1971 | Gikow | 361/434 |
| 7,821,768 | B2 | * | 10/2010 | Kanno | 361/281 |
| 2007/0242411 | A1 | * | 10/2007 | Kanno | 361/277 |
| 2009/0146498 | A1 | * | 6/2009 | Kanno | 307/72 |

FOREIGN PATENT DOCUMENTS

| JP | 2007236182 A | * | 9/2007 |
| JP | 2008-66682 | | 3/2008 |
| JP | 2009-16613 | | 1/2009 |
| JP | 2009-142043 | | 6/2009 |

* cited by examiner

*Primary Examiner* — David M Sinclair
(74) *Attorney, Agent, or Firm* — Oliff PLC

(57) ABSTRACT

A variable capacitance device including: a device body having a plurality of dielectric layers formed by a dielectric material changing in capacitance according to a control signal applied externally and laminated in a predetermined direction and an internal electrode section including at least one internal electrode formed in each of both surfaces of each dielectric layer, three or more capacitors being formed by the plurality of dielectric layers and the internal electrode section, and the three or more capacitors being connected in series with each other; and at least three control terminals supplied with the control signal, and respectively arranged for at least three internal electrodes forming at least two capacitors of the three or more capacitors.

14 Claims, 21 Drawing Sheets

FIG.4

REFERENCE CAPACITOR

| [c, k] | NUMBER k OF LAYERS | | | | |
|---|---|---|---|---|---|
| | 1 | 2 | 3 | 4 | 5 |
| 1 | (1) | 2 | 3 | 4 | 5 |
| 2 | 2 | 4 | 6 | 8 | 10 |
| 3 | 3 | 6 | 9 | 12 | 15 |
| 4 | 4 | 8 | 12 | 16 | 20 |
| 5 | 5 | 10 | 15 | 20 | 25 |
| 6 | 6 | 12 | 18 | 24 | 30 |
| 7 | 7 | 14 | 21 | 28 | 35 |
| 8 | 8 | 16 | 24 | 32 | 40 |
| 9 | 9 | 18 | 27 | 36 | 45 |
| 10 | 10 | 20 | 30 | 40 | 50 |
| 11 | 11 | 22 | 33 | 44 | 55 |
| 12 | 12 | 24 | 36 | 48 | 60 |
| 13 | 13 | 26 | 39 | 52 | 65 |
| 14 | 14 | 28 | 42 | 56 | 70 |
| 15 | 15 | 30 | 45 | 60 | 75 |

CAPACITANCE c PER LAYER (RELATIVE VALUE)

VARIABLE CAPACITANCE DEVICE WITH A PLURALITY OF ELECTRODES LAMINATED VIA DIELECTRIC LAYERS

CROSS REFERENCES TO RELATED APPLICATIONS

The present application claims priority to Japanese Priority Patent Application JP 2009-275885 filed in the Japan Patent Office on Dec. 3, 2009, the entire content of which is hereby incorporated by reference.

BACKGROUND

The present application relates to a variable capacitance device, and particularly to a variable capacitance device having a variable capacitance element in which a plurality of electrodes are laminated via dielectric layers.

Variable capacitance elements for controlling voltage and/or current are used in various electronic devices in the past. Various techniques have been proposed to obtain higher-performance elements in such variable capacitance elements (see Japanese Patent Laid-Open No. 2008-66682, Japanese Patent Laid-Open No. 2009-142043 and Japanese Patent Laid-Open No. 2009-16613 for example (hereinafter referred to as Patent Document 1, 2 and 3, respectively)).

Patent Document 1 proposes a variable capacitor including a first capacitance section in which a plurality of first capacitance electrodes and a plurality of first bias electrodes (control electrodes) are laminated alternately via a dielectric. The variable capacitor also includes a second capacitance section in which a plurality of second capacitance electrodes and a plurality of second bias electrodes are laminated alternately via a dielectric. The variable capacitor further includes a variable capacitance section in which a first bias electrode and a second bias electrode are opposed to each other via a dielectric. In Patent Document 1, the variable capacitor is formed as described above, whereby bias voltage is lowered and a rate of capacitance change is increased.

Patent Document 2 proposes a power controlling circuit for controlling input alternating-current power using a variable capacitor. In the power controlling circuit of Patent Document 2, a plurality of electrodes are laminated via a dielectric, and the electrodes are appropriately connected to an alternating-current power supply 2 and a control power supply 3 such that an equivalent circuit as shown in FIG. 20 is obtained, for example.

In the power controlling circuit 850 of Patent Document 2 shown in FIG. 20, a pair of series circuits each including two variable capacitors connected in series with each other is formed, and a point of connection between the two capacitors within each series circuit is connected to the alternating-current power supply 2 via external terminals 811 and 812. In addition, in the example shown in FIG. 20, the two series circuits are connected in series with the control power supply 3 via two control terminals 813 and 814 (external terminals). Incidentally, one control terminal 813 is connected to the positive electrode of the control power supply 3 via a DC (Direct Current) removing resistance 821, and the other control terminal 814 is connected to the negative electrode of the control power supply 3 via a DC removing resistance 822.

Patent Document 3 proposes a technique of arranging a plurality of variable capacitors in one dielectric to thereby decrease external terminals and the like and achieve miniaturization. FIGS. 21A to 21C show an example of configuration of a capacitor array proposed in Patent Document 3. Incidentally, FIG. 21A is a schematic top view of the capacitor array, FIG. 21B is a schematic bottom view of the capacitor array, and FIG. 21C is a side view of the capacitor array.

In the example shown in FIGS. 21A to 21C, four upper electrodes 902 and four upper external terminals 904 respectively connected to the four upper electrodes 902 are formed in a top surface 901a of a dielectric 901 (see FIG. 21A). Incidentally, the four upper electrodes 902 and the four upper external terminals 904 are arranged at equal intervals along a longitudinal direction of the capacitor array.

In addition, four lower electrodes 903 and four lower external terminals 905 respectively connected to the four lower electrodes 903 are formed in a bottom surface 901b of the dielectric 901 (see FIG. 21B). Incidentally, the respective lower electrodes 903 are arranged in a position opposed to the corresponding upper electrodes 902 formed in the top surface 901a of the dielectric 901 with the dielectric 901 interposed between the lower electrodes 903 and the upper electrodes 902.

In the example shown in FIGS. 21A to 21C, two central upper external terminals 904 formed in the top surface 901a of the dielectric 901 are connected to each other by an upper wiring electrode 906. In addition, on the surface of FIG. 21B, two lower external terminals 905 on a left side which external terminals are formed in the bottom surface 901b of the dielectric 901 are connected to each other by a lower wiring electrode 907, and two lower external terminals 905 on a right side which external terminals are formed in the bottom surface 901b of the dielectric 901 are connected to each other by a lower wiring electrode 908. By thus connecting each external terminal by a wiring electrode, four variable capacitors respectively formed between the four upper electrodes 902 and the four lower electrodes 903 are connected in series with each other (see FIG. 21C).

The configuration as shown in FIGS. 21A to 21C can reduce the number of external terminals with respect to the number of capacitors, and provides the following effects. By connecting the four capacitors in series with each other, an alternating voltage applied to each variable capacitor is decreased, and the withstand voltage characteristic of the element is improved. In addition, variations in characteristics such for example as the capacitance and Q-value (Quality of factor) of the element as a whole according to the alternating voltage are reduced. In addition, when the distance between the external terminals is increased, discharge between the terminals can be suppressed. Further, because the plurality of capacitors are fabricated en bloc, characteristic variations of each variable capacitor can be reduced.

SUMMARY

The various advantages described above are obtained when a plurality of variable capacitors are arranged in one dielectric, and are connected in series with each other, as in the variable capacitance device (capacitor array) proposed in the above-described Patent Document 3.

However, in a variable capacitance device of a configuration as proposed in the above-described Patent Document 3, a maximum value of width d of each internal electrode is determined by [Device Length DL−Electrode Interval g]/(Number of Elements in Same Surface). That is, in a variable capacitance device as described above, when the device length DL of the variable capacitance device is determined, an amount of increase or decrease in capacitance is determined by the interval g between internal electrodes formed in a same surface and a space between external terminals (see FIGS. 21A to 21C).

Thus, when the number of variable capacitors packaged in one dielectric is increased in a variable capacitance device as proposed in the above-described Patent Document 3, the spaces between internal electrodes and external terminals in each surface of the dielectric are narrowed, and a range of increase or decrease in capacitance is reduced. That is, a degree of freedom of design of internal electrodes or a capacitance value, for example, in one variable capacitance device is limited.

In addition, when the spaces between the internal electrodes and between the external terminals in each surface of the dielectric are narrowed, effects of parasitic capacitances (capacitors represented by broken lines in FIGS. 21B and 21C) occurring between the internal electrodes and/or between the external terminals in each surface of the dielectric are increased. In this case, crosstalk is increased. Further, when the number of variable capacitors packaged in one dielectric is increased, effects of manufacturing variations are increased, or manufacturing itself becomes difficult.

The present application has been made to solve the above problems. It is desirable to further increase a degree of freedom of design of an internal electrode and a capacitance value, for example, facilitate manufacturing, and suppress the effects of the above-described parasitic capacitances in a variable capacitance device formed by connecting a plurality of variable capacitance capacitors in series with each other.

A variable capacitance device according to an embodiment includes a device body and at least three control terminals. Each part is formed as follows. The device body has a plurality of dielectric layers formed by a dielectric material changing in capacitance according to a control signal applied externally and laminated in a predetermined direction and an internal electrode section including at least one internal electrode formed in each of both surfaces of each dielectric layer. In the device body, three or more capacitors are formed by the plurality of dielectric layers and the internal electrode section, and the three or more capacitors are connected in series with each other. The at least three control terminals are supplied with the control signal, and are respectively arranged for at least three internal electrodes forming at least two capacitors of the three or more capacitors.

In the variable capacitance device according to the above-described embodiment, the plurality of capacitors connected in series with each other are formed so as to be divided in the plurality of dielectric layers. Thus, the present application can reduce the number of internal electrodes formed in an identical surface of a dielectric layer, and further increase a space for increasing or decreasing the area of each internal electrode. In addition, in the present application, at least two capacitors of the three or more capacitors formed within the device are used as variable capacitance capacitors. Then, spaces for increasing or decreasing the area of internal electrodes forming the plurality of variable capacitance capacitors are increased, and therefore an amount of variation in capacitance can be set in a wider range.

As described above, in a variable capacitance device according to an embodiment, a space for increasing or decreasing the area of internal electrodes formed in an identical surface of a dielectric layer can be increased. Thus, according to an embodiment, it is possible to further increase a degree of freedom of design of an internal electrode and a capacitance value, for example, in a variable capacitance device, and manufacture the variable capacitance device easily. In addition, according to an embodiment, a distance between internal electrodes is increased, and therefore effects of parasitic capacitance occurring between internal electrodes can be suppressed.

Additional features and advantages are described herein, and will be apparent from the following Detailed Description and the figures.

BRIEF DESCRIPTION OF THE FIGURES

FIG. 4 is a diagram of assistance in explaining a degree of freedom of capacitance design in the variable capacitance device;

DETAILED DESCRIPTION

An example of constitution of a variable capacitance device according to an embodiment will hereinafter be described in the following order with reference to the drawings. It is to be noted that the present application is not limited to the following examples.

1. Example of Basic Constitution of Variable Capacitance Device according to Present Application
2. Various Examples of Modification

Figure 1A:
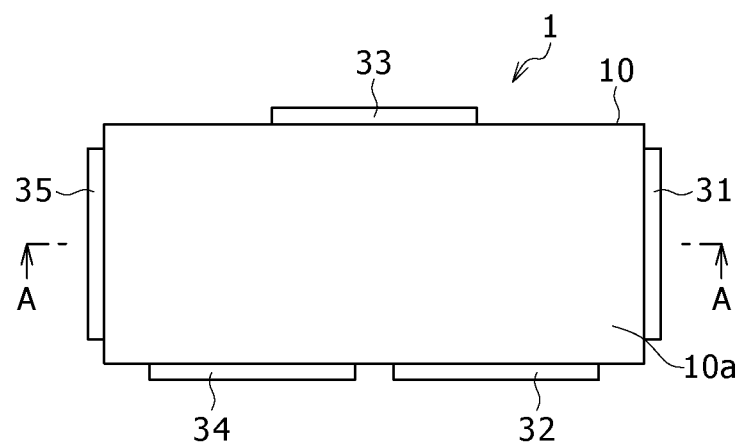
FIGS. 1A and 1B are diagrams of general configuration of a variable capacitance device according to one embodiment.
Figure 1B:
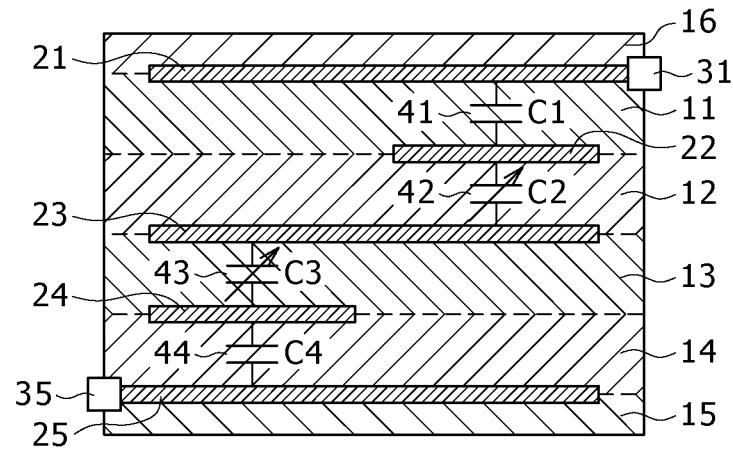

1. Example of Basic Constitution of Variable Capacitance Device According To Present Application Constitution of Variable Capacitance Device FIGS. 1A and 1B schematically show a constitution of a variable capacitance device according to an embodiment. Incidentally, FIG. 1A is a schematic top view of the variable capacitance device according to the present embodiment, and FIG. 1B is a section view taken along a line A-A in FIG. 1A.

The variable capacitance device 1 according to the present embodiment includes a device body 10 and five external terminals 31 to 35 (hereinafter referred to as a first to a fifth external terminal, respectively). The device body 10 can be formed by a rectangular parallelepiped member having a rectangular top surface 10a.

In the present embodiment, the first external terminal 31 is formed on a side surface on one short side (right side in FIG. 1A) of the top surface 10a of the device body 10, and the fifth external terminal 35 is formed on a side surface on another short side of the top surface 10a of the device body 10.

In addition, in the present embodiment, the second external terminal 32 and the fourth external terminal 34 (control terminals) are formed on a side surface on one long side (lower side in FIG. 1A) of the top surface 10a of the device body 10 along a direction of the long side in a state of being separated at a predetermined distance from each other. Incidentally, the second external terminal 32 is formed on the side of the first external terminal 31 on the side surface on one long side of the top surface 10a of the device body 10, and the fourth external terminal 34 is formed on the side of the fifth external terminal 35 on the side surface on one long side of the top surface 10a of the device body 10. The third external terminal 33 (control terminal) is formed on a side surface on another long side (upper side in FIG. 1A) of the top surface 10a of the device body 10, and is disposed at substantially a central part in a direction of the long side.

As shown in FIG. 1B, the device body 10 includes six dielectric layers 11 to 16 and five internal electrodes (internal electrode sections) 21 to 25. Incidentally, for convenience of description, the dielectric layers 11 to 14, 15, and 16 will hereinafter be referred to as a first to a fourth dielectric layer, a lower dielectric layer, and an upper dielectric layer, respectively, as appropriate, and the internal electrodes 21 to 25 will hereinafter be referred to as a first to a fifth electrode, respectively, as appropriate.

The device body 10 is formed by laminating the fifth electrode 25, the fourth dielectric layer 14, the fourth electrode 24, the third dielectric layer 13, the third electrode 23, the second dielectric layer 12, the second electrode 22, the first dielectric layer 11, and the first electrode 21 in order on the lower dielectric layer 15. Then, the upper dielectric layer 16 is laminated onto the first electrode 21. In addition, in the present embodiment, the first to fifth electrodes 21 to 25 are connected to the first to fifth external terminals 31 to 35, respectively.

Being formed as described above, the first to fourth dielectric layers 11 to 14 have capacitors 41 to 44 (hereinafter referred to as a first to a fourth capacitor, respectively) of respective capacitances C1 to C4 formed therein. That is, in the variable capacitance device 1 according to the present embodiment, one capacitor is provided in each dielectric layer (four capacitors in total), these capacitors are connected in series with each other, and one external terminal is provided for each internal electrode.

In the present embodiment, the second capacitor 42 and the third capacitor 43 formed within the second dielectric layer 12 and the third dielectric layer 13, respectively, are used as variable capacitance capacitors. The first capacitor 41 and the fourth capacitor 44 formed within the first dielectric layer 11 and the fourth dielectric layer 14, respectively, are used as DC removing capacitors (fixed capacitance capacitors for removing a direct current). Incidentally, the present application is not limited to this. The four capacitors formed within the variable capacitance device 1 may all be used as variable capacitance capacitors. An example of such a constitution will be described in a second example of modification to be described later.

The configuration of each dielectric layer will next be described. The shape of a surface of each dielectric layer in which surface an internal electrode is formed is a rectangular shape, and a ratio of a long side to a short side of the rectangular shape can be 2:1, for example.

Suppose in the present embodiment that the first to fourth dielectric layers 11 to 14 have a same thickness (for example about 2 μm). However, the present application is not limited to this. The thickness of the first to fourth dielectric layers 11 to 14 can be set appropriately according to a use or a necessary capacitance, for example. For example, the first to fourth dielectric layers 11 to 14 may all have different thicknesses, or only a part of the first to fourth dielectric layers 11 to 14 may be changed in thickness. In addition, the thickness of the lower dielectric layer 15 and the upper dielectric layer 16 can be set appropriately according to a use, for example.

In the present embodiment, the first to fourth dielectric layers 11 to 14, the lower dielectric layer 15, and the upper dielectric layer 16 are formed of a same dielectric material. Incidentally, the present application is not limited to this. The material for forming each dielectric layer may be changed. However, it is desirable from a viewpoint of ease of manufacturing that all the dielectric layers be formed of a same dielectric material.

In addition, because at least two of the four capacitors formed within the variable capacitance device 1 according to the present embodiment are used as variable capacitance capacitors, each dielectric layer is formed of a ferroelectric material whose relative dielectric constant exceeds 1000, for example. By forming each dielectric layer of such a ferroelectric material, the capacitance of each dielectric layer can be changed according to a control signal applied externally.

A ferroelectric material exhibiting ionic polarization can be used as such a ferroelectric material. A ferroelectric material exhibiting ionic polarization is formed by an ionic crystal material, and is a ferroelectric material electrically polarized as a result of positive ion and negative ion atoms being displaced. Generally, supposing that two predetermined elements are A and B, a ferroelectric material exhibiting ionic polarization is expressed by a chemical formula $ABO_3$ (O is an oxygen element), and has a perovskite structure. Such ferroelectric materials include barium titanate ($BaTiO_3$), potassium niobate ($KNbO_3$), and lead titanate ($PbTiO_3$). In addition, PZT (lead zirconate titanate) obtained by mixing lead titanate ($PbTiO_3$) with lead zirconate ($PbZrO_3$), for example, may be used as a ferroelectric material.

In addition, a ferroelectric material exhibiting electronic polarization may be used as a ferroelectric material. In this ferroelectric material, an electric dipole moment occurs with the ferroelectric material divided into a part dominated by a positive charge and a part dominated by a negative charge, and polarization occurs. Rare-earth iron oxides forming a polarization by forming an $Fe^{2+}$ charge surface and an $Fe^{3+}$ charge surface and exhibiting ferroelectric characteristics have been reported as such materials in the past. In this system, letting RE be a rare-earth element and TM be an iron group element, materials expressed by a molecular formula $(RE).(TM)_2.O_4$ (O: oxygen element) are reported to have a high dielectric constant. Incidentally, rare-earth elements include Y, Er, Yb, and Lu (Y and heavy rare-earth elements in particular), and iron group elements include Fe, Co, and Ni (Fe in particular). $(RE).(TM)_2.O_4$ includes $ErFe_2.O_4$, $LuFe_2.O_4$, and $YFe_2.O_4$. A ferroelectric material having an anisotropy may also be used as a ferroelectric material.

The configuration of each internal electrode will next be described. FIGS. 2A to 2E show general configurations of the first to fifth electrodes 21 to 25, respectively. Incidentally, FIGS. 2A to 2E are schematic top views of the first to fifth electrodes 21 to 25 formed on the respectively corresponding dielectric layers.

In the present embodiment, as shown in FIGS. 2A to 2E, the surfaces of the first to fifth electrodes 21 to 25 all have a rectangular shape. However, the surface shape of each internal electrode is not limited to the shape in this example, but can be changed as appropriate according to a form of arrangement of the external terminals and the shape of the device body 10, for example.

Figure 2A:
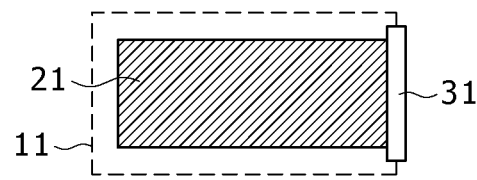
FIGS. 2A, 2B, 2C, 2D, and 2E are diagrams of general configuration of each internal electrode in the variable capacitance device according to one embodiment.

As shown in FIG. 2A, the first electrode 21 is formed along a longitudinal direction of the first dielectric layer 11 so as to extend from the vicinity of one short side of the first dielectric layer 11 to the vicinity of another short side of the first dielectric layer 11. One short side end part of the first electrode 21 is connected to the first external terminal 31.

Figure 2B:
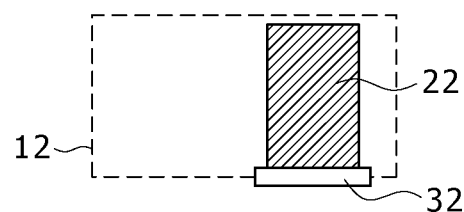

As shown in FIG. 2B, the second electrode 22 is formed along a lateral direction of the second dielectric layer 12 so as to extend from the vicinity of one long side of the second dielectric layer 12 to the vicinity of another long side of the second dielectric layer 12. One short side end part of the second electrode 22 is connected to the second external terminal 32.

Figure 2C:
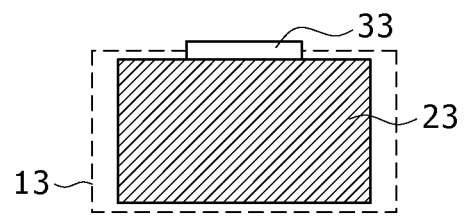

As shown in FIG. 2C, the third electrode 23 is formed along a longitudinal direction of the third dielectric layer 13 so as to extend from the vicinity of one short side of the third dielectric layer 13 to the vicinity of another short side of the third dielectric layer 13. A part (central part) of one long side end part of the third electrode 23 is connected to the third external terminal 33.

Figure 2D:
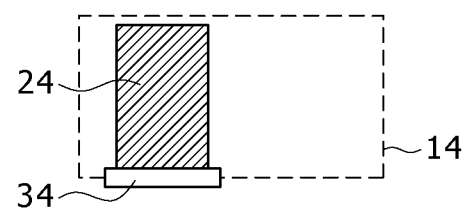

As shown in FIG. 2D, the fourth electrode 24 is formed along a lateral direction of the fourth dielectric layer 14 so as to extend from the vicinity of one long side of the fourth dielectric layer 14 to the vicinity of another long side of the fourth dielectric layer 14. One short side end part of the fourth electrode 24 is connected to the fourth external terminal 34.

Figure 2E:
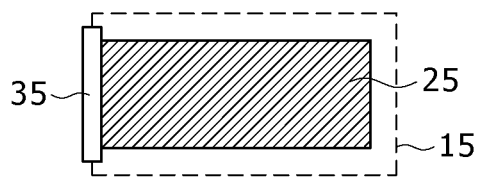

As shown in FIG. 2E, the fifth electrode 25 is formed along a longitudinal direction of the lower dielectric layer 15 so as to extend from the vicinity of one short side of the lower dielectric layer 15 to the vicinity of another short side of the lower dielectric layer 15. One short side end part of the fifth electrode 25 is connected to the fifth external terminal 35.

Incidentally, to form a capacitor in each dielectric layer, each internal electrode is disposed at a position such that an opposing region is formed between the internal electrode and an adjacent internal electrode with the dielectric layer interposed between the internal electrodes. In addition, the configuration (shape and dimensions, for example) of each internal electrode is not limited to the examples shown in FIGS. 2A to 2E, but can be set appropriately in consideration of a use or a necessary capacitance, for example. With the constitution of the variable capacitance device 1 according to the present embodiment described above, the capacitance of the capacitor formed in each dielectric layer is determined by the areas of the second electrode 22 and the fourth electrode 24.

The first to fifth electrodes 21 to 25 are for example formed by using a conductive paste including a metallic fine powder (Pd, Pd/Ag, Ni or the like). Thus, the manufacturing cost of the variable capacitance device 1 can be reduced. Incidentally, in the present embodiment, the first to fifth electrodes 21 to 25 are formed of a same material. However, the present application is not limited to this. The first to fifth electrodes 21 to 25 may be formed of materials different from each other according to a use, for example.

As described above, in the present embodiment, one internal electrode (internal electrode section) is formed in each of an upper surface and a lower surface (both surfaces) of one dielectric layer. Thus, the following effects are obtained.

Figure 21A:
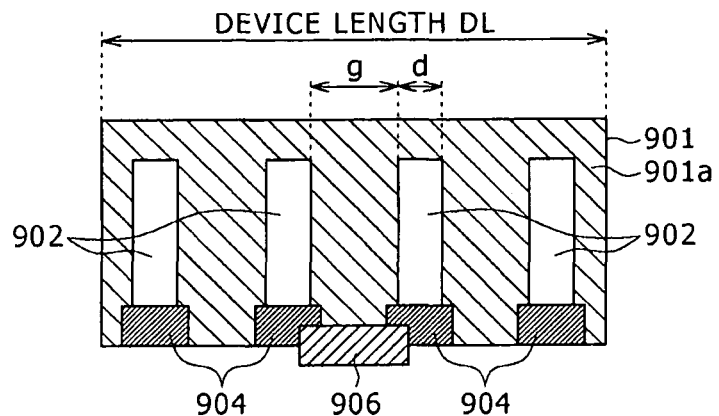
FIGS. 21A, 21B, and 21C show another example of general configuration of a variable capacitance device in the past.
Figure 21B:
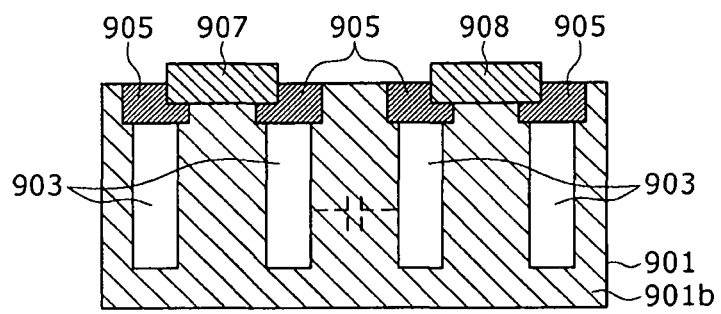
Figure 21C:
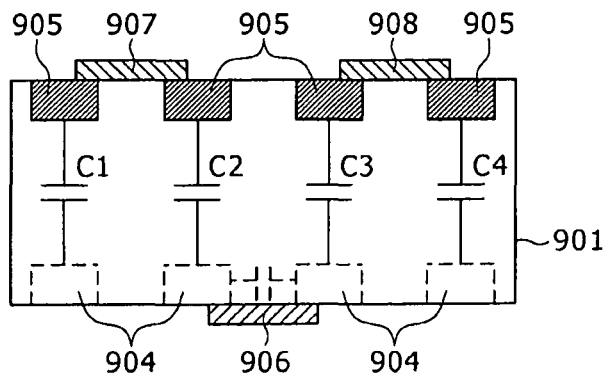

(1) The electrode area of the internal electrode can be increased up to the size of the variable capacitance device 1 (surface area of the dielectric layers). That is, the constitution of the present embodiment can increase a variable range of the area of each internal electrode. More specifically, the area of the internal electrode can be increased by a factor of about four or more as compared with a variable capacitance device of a constitution having four capacitors arranged in one dielectric as shown in FIGS. 21A to 21C, for example.

(2) A parasitic capacitance between internal electrodes can be greatly reduced.

(3) Because the electrode area of the internal electrode per layer can be made larger, the internal electrode can be designed and fabricated easily.

Further, with the constitution of the variable capacitance device 1 according to the present embodiment, as described above, DC removing capacitors can be incorporated in the variable capacitance device 1 easily, and the configurations (electrode area and the number of laminated layers, for example) of the DC removing capacitors and variable capacitance capacitors can be designed separately from each other. Thus, the variable capacitance device 1 according to the present embodiment can further increase a degree of freedom of design of electrodes and capacitance values, for example. In addition, thus, variable capacitance devices having various capacitances can be fabricated at low cost and with ease, and a wide selection of variable capacitance devices having various capacitances can be offered.

Method of Fabricating Variable Capacitance Device

An example of a method of fabricating the variable capacitance device 1 according to the present embodiment will next be described briefly. First, a sheet member (having a thickness of about 2.5 μm, for example) formed of a dielectric material described above is prepared. Incidentally, this sheet member will become one of the first to fourth dielectric layers 11 to 14 and the lower dielectric layer 15 described above.

Next, a conductive paste is prepared by making a metallic fine powder of Pd, Pd/Ag, or Ni, for example, into a paste. Then, an internal electrode is formed by coating (silk screen printing or the like) one surface of the sheet member with the conductive paste via a mask having an opening therein which opening corresponds to the shape (rectangular shape) of the internal electrode. In the present embodiment, a total of five sheet members having an internal electrode formed on one surface thereof (hereinafter referred to as sheet members with electrodes) are fabricated.

Next, the five sheet members with electrodes prepared as described above are laminated in predetermined order such that the internal electrodes and the sheet members are arranged alternately. At this time, the sheet members with electrodes are laminated such that the internal electrodes are arranged in forms as shown in FIGS. 2A to 2E. Next, a sheet member without an internal electrode formed thereon, which sheet member is prepared separately, is laminated to a surface on a side where an internal electrode is exposed. This sheet member prepared separately becomes the upper dielectric layer 16.

Next, the laminated members are thermocompression-bonded to each other. Then, the thermocompression-bonded members are fired at a high temperature in a reducing atmosphere, whereby the sheet members and conductive paste layers (internal electrodes) are made integral with each other. The device body 10 is thus fabricated.

Then, the first to fifth external terminals 31 to 35 are attached to predetermined positions on the side surfaces of the device body 10. The variable capacitance device 1 is thus fabricated in the present embodiment.

Example of Configuration of Voltage Controlling Circuit

Figure 3:
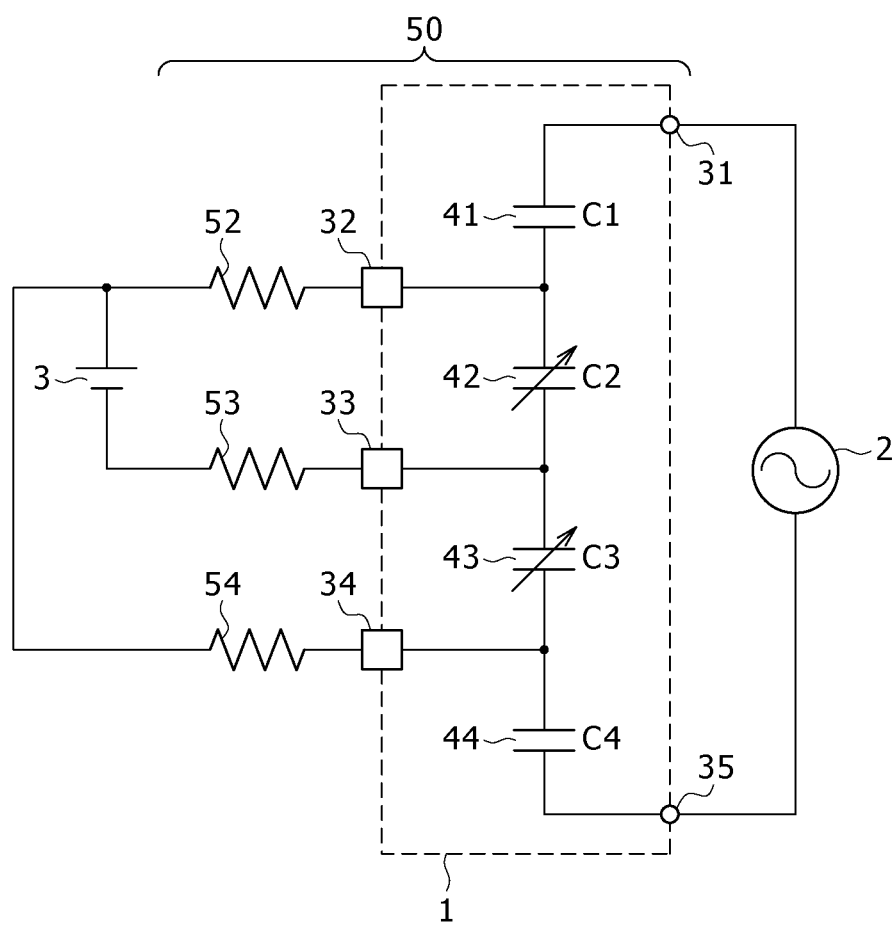
FIG. 3 is a diagram of general configuration of a voltage controlling circuit using the variable capacitance device according to one embodiment.

An example of a voltage controlling circuit using the variable capacitance device 1 according to the present embodiment will next be described. FIG. 3 shows a circuit configuration of the voltage controlling circuit. The voltage controlling circuit 50 shown in FIG. 3 is for example provided between an alternating-current power supply 2 and a circuit such as a rectifier circuit (not shown), and adjusts an alternating voltage (input signal) input from the alternating-current power supply 2 to the circuit such as a rectifier circuit to a predetermined voltage value. Incidentally, terminals 31 to 35 in FIG. 3 respectively correspond to the first to fifth external terminals 31 to 35 of the variable capacitance device 1 in FIG. 1A.

The voltage controlling circuit 50 includes the variable capacitance device 1 according to the present embodiment and three DC removing resistances 52 to 54. The variable capacitance device 1 according to the present embodiment is represented by an equivalent circuit as shown in FIG. 3, in which circuit the first to fourth capacitors 41 to 44 are connected in series with each other in this order.

In the present embodiment, as described above, the second capacitor 42 and the third capacitor 43 are used as variable capacitance capacitors, and the first capacitor 41 and the fourth capacitor 44 are used as DC removing capacitors. Thus, the first external terminal 31 of the variable capacitance device 1 is connected to one output terminal of the alternating-current power supply 2, and the fifth external terminal 35 of the variable capacitance device 1 is connected to another output terminal of the alternating-current power supply 2. That is, the series circuit of the first to fourth capacitors 41 to 44 is connected in parallel with the alternating-current power supply 2. Incidentally, though not shown in FIG. 3, the circuit such as a rectifier circuit or the like supplied with a signal from the alternating-current power supply 2 is connected in parallel between the first external terminal 31 and the fifth external terminal 35 of the variable capacitance device 1.

The second external terminal 32 and the fourth external terminal 34 of the variable capacitance device 1 are connected to the positive electrode terminal of a control power supply 3 via the DC removing resistances 52 and 54, respectively. The third external terminal 33 is connected to the negative electrode terminal of the control power supply 3 via the DC removing resistance 53. That is, in the present embodiment, the control power supply 3 is connected in parallel with each of the second capacitor 42 and the third capacitor 43. The capacitance C2 of the second capacitor 42 and the capacitance C3 of the third capacitor 43 are adjusted by a direct-current signal (control signal) input from the control power supply 3.

Incidentally, the first capacitor 41 and the fourth capacitor 44 used as DC removing capacitors and the three DC removing resistances 52 to 54 are provided to suppress an effect of interference between a direct-current bias current flowing from the control power supply 3 and an alternating current from the alternating-current power supply 2. Incidentally, in the present embodiment, DC removing inductors (coils) may be used in place of the DC removing resistances.

In the present embodiment, description has been made of an example in which the control signal (control voltage) is obtained from the control power supply 3. However, the present application is not limited to this. For example, a desired control voltage may be extracted from a direct-current voltage output from the circuit such as a rectifier circuit (not shown) by a method of resistive division, for example.

In addition, in the present embodiment, description has been made of an example in which the variable capacitance device 1 does not include the DC removing resistances 52 to 54. However, the present application is not limited to this. The variable capacitance device 1 may include the DC removing resistances 52 to 54.

Comparison of Degree of Freedom of Capacitance Design

As described above, the variable capacitance device 1 according to the present embodiment can further increase the degree of freedom of capacitance design. An example of evaluation of this effect will be described in the following. A combination [c, k] of a capacitance c per dielectric layer and the number k of dielectric layers will be used in the following as an index for evaluating the degree of freedom of capacitance design. In one variable capacitance device of a predetermined size, the larger the number of combinations [c, k] of both parameters, the higher the degree of freedom of capacitance design.

FIG. 4 shows a result of comparison between the degree of freedom of capacitance design of the variable capacitance device according to the present embodiment and the degree of freedom of capacitance design of the conventional variable capacitance device (comparative example) shown in FIGS. 21A to 21C. The table of FIG. 4 shows the number of reference capacitors to be described later which reference capacitors can be equivalently formed within a variable capacitance device when the combination [c, k] of a capacitance c (relative value) per dielectric layer in which a capacitor is formed within the variable capacitance device and the number k of dielectric layers is changed.

A method of viewing the table of FIG. 4 will be described below more concretely. Suppose in the example of FIG. 4 that a combination [c, k]=[1, 1] of a capacitance c per dielectric layer and the number k of dielectric layers is a reference capacitor. A numerical value entered in the section of a combination [c, k] of a capacitance c per dielectric layer and the number k of dielectric layers in the table of FIG. 4 is a value obtained by multiplying together both the parameters (c×k). The value obtained by multiplying together both the parameters (c×k) corresponds to the number of reference capacitors that can be equivalently formed within one variable capacitance device.

For example, the variable capacitance device 1 according to the above-described embodiment shown in FIG. 1 corresponds to the section of a combination [c, k]=[1, 4] of a capacitance c per dielectric layer and the number k of dielectric layers in the table of FIG. 4. A numerical value in this section is "4," which indicates that four reference capacitors (capacitors of [c, k]=[1, 1]) can be equivalently formed in the variable capacitance device 1 according to the above-described embodiment.

Consideration will be given to a case of designing a variable capacitance device in which 3 to 30 reference capacitors can be formed with the constitution (present application) where one capacitor is formed in one dielectric layer as in the variable capacitance device 1 described in the foregoing embodiment. Incidentally, with the constitution according to the present embodiment, the capacitance c per dielectric layer can be varied by changing the area of each internal electrode. Further, suppose in this case that the surface size of the device is an area about 15 times that of an electrode of the reference capacitor, that is, a size allowing a maximum of about 15 reference capacitors to be formed per dielectric layer. In addition, suppose that a maximum value of the number k of dielectric layers in the example of FIG. 4 is five.

Under dimension constraints as described above, a design allowing range in the constitution according to the foregoing embodiment is a region 60 enclosed by a thick frame in the table of FIG. 4. In this case, variable capacitance devices corresponding to the number of reference capacitors (c×k)= 17, 19, 23, and 29 (four kinds in total) cannot be designed.

Consideration will also be given to a case of designing a variable capacitance device in which 3 to 30 reference capacitors can be formed with a constitution as of the existing variable capacitance device (comparative example) described with reference to FIGS. 21A to 21C. However, suppose that constraints such as the surface size of the device according to the comparative example and the like are similar to those of the case of evaluating the present application.

With the constitution of the internal electrodes according to the comparative example, the capacitance c per dielectric layer can be changed by the number of internal electrodes formed in the same surface of the dielectric layer. However, the constitution according to the comparative example requires a certain space to be set between internal electrodes so as to prevent a parasitic capacitance between the internal electrodes.

Thus, when the device size of the comparative example is the same as the evaluation size of the present application described above, a maximum number of reference capacitors that can be formed in one dielectric layer in the comparative example is about six. Hence, with the constitution according to the comparative example, a region 70 hatched in the table of FIG. 4 is a design allowing range of the combination [c, k] of a capacitance c per dielectric layer and the number k of dielectric layers. In this case, variable capacitance devices corresponding to the number of reference capacitors (c×k)=7, 11, 13, 14, 17, 19, 21 to 23, and 26 to 29 (13 kinds in total) cannot be designed.

As is clear from the comparison result shown in FIG. 4, the design range of the combination [c, k] of a capacitance c per dielectric layer and the number k of dielectric layers in the variable capacitance device according to the foregoing embodiment is wider than in the existing variable capacitance device. That is, the variable capacitance device according to the foregoing embodiment can increase the degree of freedom of capacitance design as compared with the existing variable capacitance device.

2. Various Examples of Modification

In the foregoing embodiment, description has been made of an example in which four capacitors are connected in series with each other within the variable capacitance device 1, capacitors at both ends among the capacitors are used as DC removing capacitors, and the other two capacitors are used as variable capacitance capacitors. However, the present application is not limited to this. For example, the number of capacitors connected in series with each other (number of laminated dielectric layers), the number of variable capacitance capacitors within the variable capacitance device, and the like can be changed as appropriate according to a use, a necessary capacitance, and the like. Description in the following will be made of such various examples of modification.

First Example of Modification

Figure 5A:
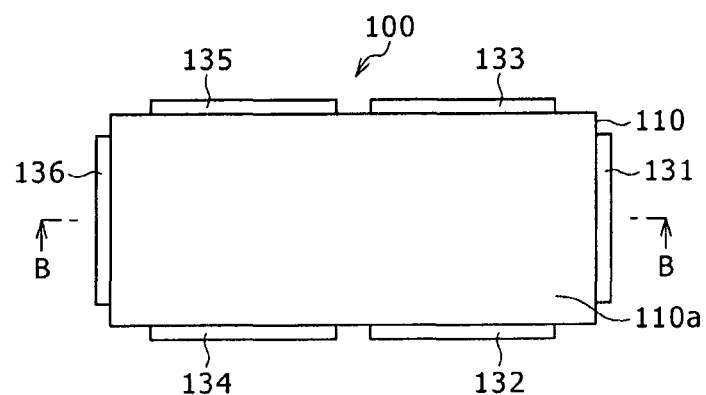
FIGS. 5A and 5B are diagrams of general configuration of a variable capacitance device according to a first example of modification.
Figure 5B:
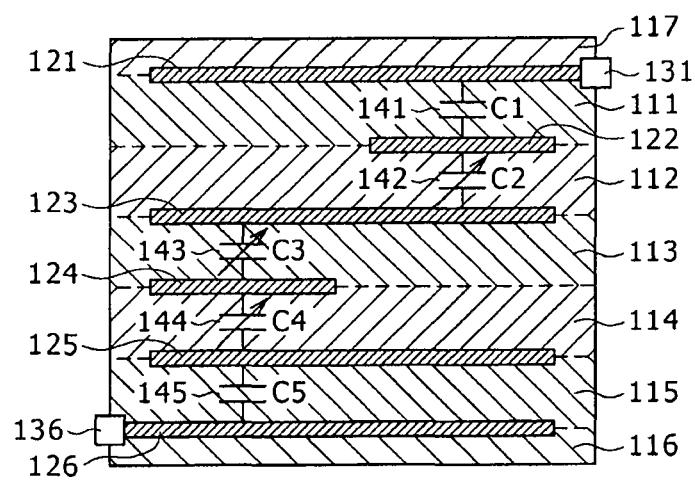

In a first example of modification, description will be made of an example of constitution in which five capacitors are connected in series with each other within a variable capacitance device. FIGS. 5A and 5B show a general configuration of a variable capacitance device according to the first example of modification. Incidentally, FIG. 5A is a schematic top view of the variable capacitance device according to the first example of modification, and FIG. 5B is a section view taken along a line B-B in FIG. 5A.

The variable capacitance device 100 according to the first example of modification includes a device body 110 and six external terminals 131 to 136 (hereinafter referred to as a first to a sixth external terminal, respectively). As in the foregoing embodiment, the device body 110 is formed by a rectangular parallelepiped member having a rectangular top surface 110a.

The first external terminal 131 is formed on a side surface on one short side (right side in FIG. 5A) of the top surface 110a of the device body 110. The sixth external terminal 136 is formed on a side surface on another short side (left side in FIG. 5A) of the top surface 110a of the device body 110.

The third external terminal 133 and the fifth external terminal 135 are formed on a side surface on one long side (upper side in FIG. 5A) of the top surface 110a of the device body 110 along a direction of the long side in a state of being separated at a predetermined distance from each other. Incidentally, the third external terminal 133 and the fifth external terminal 135 are formed on the side of the first external terminal 131 and the side of the sixth external terminal 136, respectively, on the side surface on one long side of the top surface 110a of the device body 110.

The second external terminal 132 and the fourth external terminal 134 are formed on a side surface on another long side (lower side in FIG. 5A) of the top surface 110a of the device body 110 along a direction of the long side in a state of being separated at a predetermined distance from each other. Incidentally, the second external terminal 132 and the fourth external terminal 134 are formed on the side of the first external terminal 131 and the side of the sixth external terminal 136, respectively, on the side surface on the other long side of the top surface 110a of the device body 110.

As shown in FIG. 5B, the device body 110 includes seven dielectric layers 111 to 117 (hereinafter referred to as a first to a fifth dielectric layer, a lower dielectric layer, and an upper dielectric layer, respectively) and six internal electrodes 121 to 126 (hereinafter referred to as a first to a sixth electrode, respectively).

The device body 110 is formed by laminating the sixth electrode 126, the fifth dielectric layer 115, the fifth electrode 125, the fourth dielectric layer 114, the fourth electrode 124, the third dielectric layer 113, and the third electrode 123 in order on the lower dielectric layer 116. Further, the device body 110 is formed by laminating the second dielectric layer 112, the second electrode 122, the first dielectric layer 111, the first electrode 121, and the upper dielectric layer 117 in order on the third electrode 123. In this example, the first to sixth electrodes 121 to 126 are connected to the first to sixth external terminals 131 to 136, respectively.

The configuration of each internal electrode will next be described. FIGS. 6A to 6F show general configurations of the first to sixth electrodes 121 to 126, respectively. Incidentally, FIGS. 6A to 6F are schematic top views of the first to sixth electrodes 121 to 126 formed on the respectively corresponding dielectric layers.

In this example, as shown in FIGS. 6A to 6F, the surfaces of the first to sixth electrodes 121 to 126 all have a rectangular shape. Incidentally, the surface shape of each internal electrode is not limited to the shape in this example, but can be changed as appropriate according to a form of arrangement of the external terminals and the shape of the device body 110, for example.

Figure 6A:
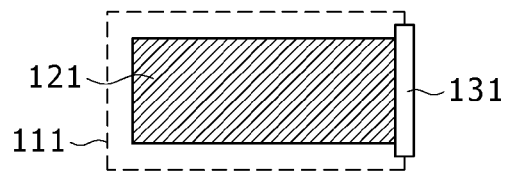
FIGS. 6A, 6B, 6C, 6D, 6E, and 6F are diagrams of general configuration of each internal electrode in the variable capacitance device according to the first example of modification.

As shown in FIG. 6A, the first electrode 121 is formed along a longitudinal direction of the first dielectric layer 111 so as to extend from the vicinity of one short side of the first dielectric layer 111 to the vicinity of another short side of the first dielectric layer 111. One short side end part of the first electrode 121 is connected to the first external terminal 131.

Figure 6B:
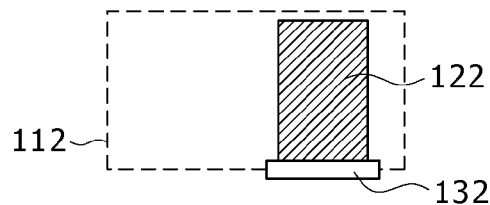

As shown in FIG. 6B, the second electrode 122 is formed along a lateral direction of the second dielectric layer 112 so as to extend from the vicinity of one long side of the second dielectric layer 112 to the vicinity of another long side of the second dielectric layer 112. One short side end part of the second electrode 122 is connected to the second external terminal 132.

Figure 6C:
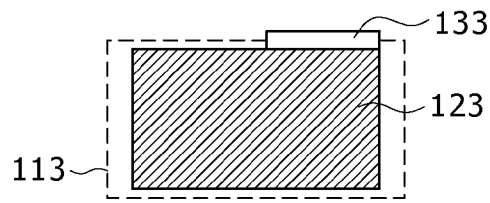

As shown in FIG. 6C, the third electrode 123 is formed along a longitudinal direction of the third dielectric layer 113 so as to extend from the vicinity of one short side of the third dielectric layer 113 to the vicinity of another short side of the third dielectric layer 113. A part on one short side (right side in FIG. 6C) on one long side (upper long side in FIG. 6C) of the third electrode 123 is connected to the third external terminal 133.

Figure 6D:
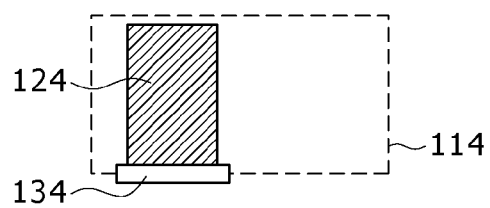

As shown in FIG. 6D, the fourth electrode 124 is formed along a lateral direction of the fourth dielectric layer 114 so as to extend from the vicinity of one long side of the fourth dielectric layer 114 to the vicinity of another long side of the fourth dielectric layer 114. One short side end part of the fourth electrode 124 is connected to the fourth external terminal 134.

Figure 6E:
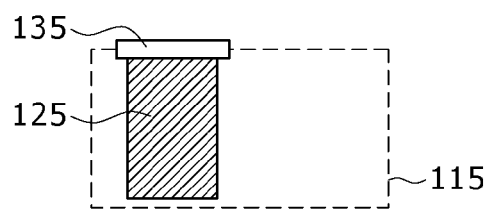

As shown in FIG. 6E, the fifth electrode 125 is formed along a lateral direction of the fifth dielectric layer 115 so as to extend from the vicinity of one long side of the fifth dielectric layer 115 to the vicinity of another long side of the fifth dielectric layer 115. One short side end part of the fifth electrode 125 is connected to the fifth external terminal 135.

Figure 6F:
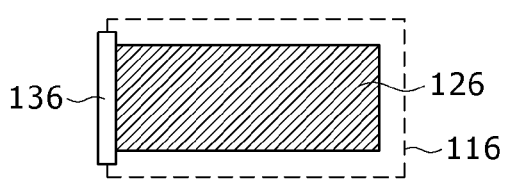

As shown in FIG. 6F, the sixth electrode 126 is formed along a longitudinal direction of the lower dielectric layer 116 so as to extend from the vicinity of one short side of the lower dielectric layer 116 to the vicinity of another short side of the lower dielectric layer 116. One short side end part of the sixth electrode 126 is connected to the sixth external terminal 136.

Incidentally, to form a capacitor in each dielectric layer, each internal electrode is disposed at a position such that an opposing region is formed between the internal electrode and an adjacent internal electrode with the dielectric layer interposed between the internal electrodes. Incidentally, the variable capacitance device 100 in this example can be fabricated in a similar manner to that of the foregoing embodiment.

Being formed as described above, the first to fifth dielectric layers 111 to 115 have capacitors 141 to 145 (hereinafter referred to as a first to a fifth capacitor, respectively) of respective capacitances C1 to C5 formed therein. That is, in the variable capacitance device 100 in this example, one capacitor is provided in each dielectric layer (five capacitors in total), these capacitors are connected in series with each other, and further one external terminal is provided for each internal electrode. Incidentally, with the constitution of the variable capacitance device 100 in this example, the capacitance of the capacitor formed in each dielectric layer is determined by the areas of the second electrode 122, the fourth electrode 124, and the fifth electrode 125.

In this example, the second to fourth capacitors 142 to 144 formed within the second to fourth dielectric layers 112 to 114, respectively, are used as variable capacitance capacitors. The first capacitor 141 and the fifth capacitor 145 formed within the first dielectric layer 111 and the fifth dielectric layer 115, respectively, are used as DC removing capacitors.

Incidentally, the constitution (for example a forming material, surface shape and dimensions, and thickness) of each dielectric layer can be made similar to the constitution of the dielectric layers used in the foregoing embodiment. In addition, the constitution (for example shape and dimensions) of each internal electrode is not limited to the examples shown in FIGS. 6A to 6F, but can be set appropriately in consideration of a use or a necessary capacitance, for example.

As described above, also in this example, as in the foregoing embodiment, one internal electrode is formed in each of an upper surface and a lower surface of one dielectric layer. Thus, as with the foregoing embodiment, the variable capacitance device 100 in this example can further increase the degree of freedom of design of the variable capacitance device, be manufactured easily, and suppress an effect of a parasitic capacitance occurring between internal electrodes.

Figure 7:
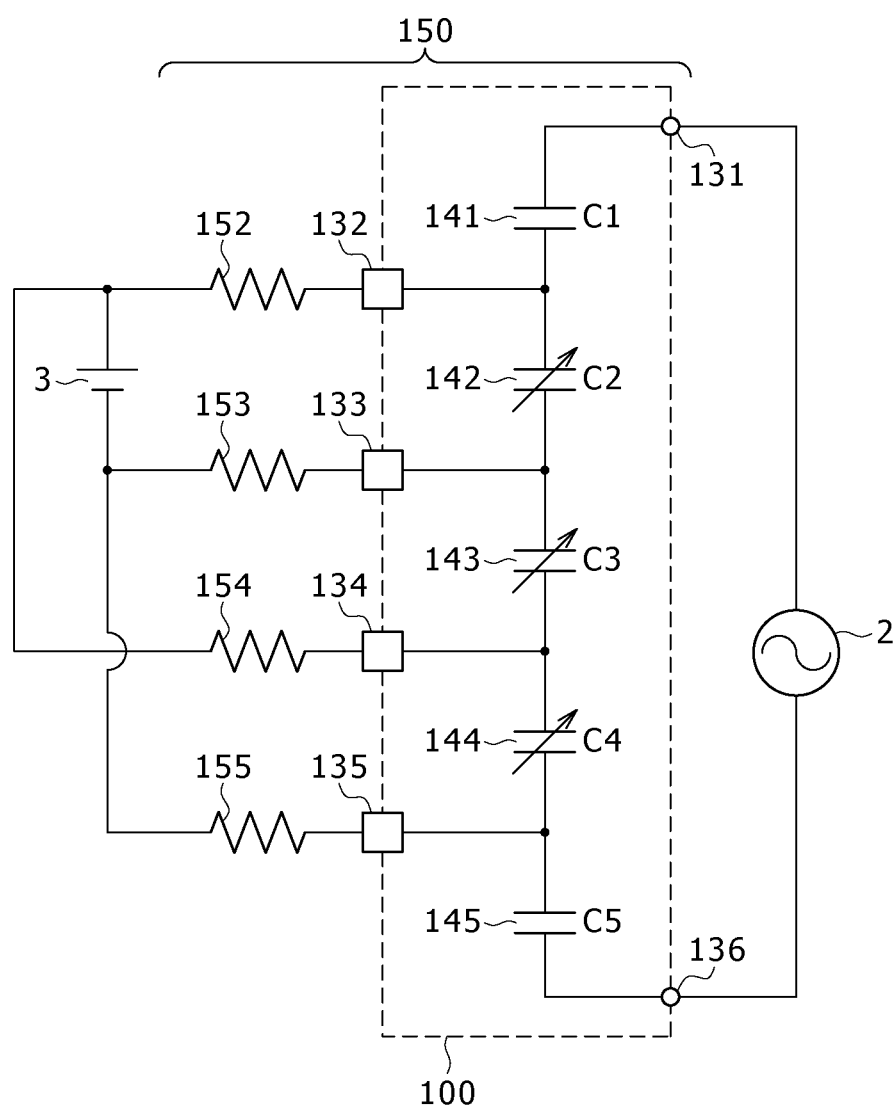
FIG. 7 is a diagram of general configuration of a voltage controlling circuit using the variable capacitance device according to the first example of modification.

FIG. 7 shows an example of configuration of a voltage controlling circuit using the variable capacitance device 100 in this example. Incidentally, terminals 131 to 136 in FIG. 7 respectively correspond to the first to sixth external terminals 131 to 136 of the variable capacitance device 100 in FIG. 5A.

The voltage controlling circuit 150 in this example includes the variable capacitance device 100 and four DC removing resistances 152 to 155. The variable capacitance device 100 in this example is represented by an equivalent circuit in which the first to fifth capacitors 141 to 145 are connected in series with each other in this order.

As described above, in this example, the second to fourth capacitors 142 to 144 are used as variable capacitance capacitors, and the first capacitor 141 and the fifth capacitor 145 are used as DC removing capacitors. Thus, in this example, the first external terminal 131 of the variable capacitance device 100 is connected to one output terminal of an alternating-current power supply 2, and the sixth external terminal 136 of the variable capacitance device 100 is connected to another output terminal of the alternating-current power supply 2. That is, the series circuit of the first to fifth capacitors 141 to 145 is connected in parallel with the alternating-current power supply 2.

In addition, the second external terminal 132 and the fourth external terminal 134 in this example are connected to the positive electrode terminal of a control power supply 3 via the DC removing resistances 152 and 154, respectively. Further, the third external terminal 133 and the fifth external terminal 135 are connected to the negative electrode terminal of the control power supply 3 via the DC removing resistances 153 and 155, respectively. That is, in the present example, the control power supply 3 is connected in parallel with each of the second to fourth capacitors 142 to 144.

The voltage controlling circuit 150 in this example changes the respective capacitances of the second to fourth capacitors 142 to 144 by a control voltage input from the control power supply 3, and adjusts an alternating voltage input from the alternating-current power supply 2 to a circuit such as a rectifier circuit (not shown) to a predetermined voltage value.

Incidentally, in this example, description has been made of an example in which the variable capacitance device 100 does not include the DC removing resistances 152 to 155. However, the present application is not limited to this. The variable capacitance device 100 may include the DC removing resistances 152 to 155. In addition, in this example, DC removing inductors may be used in place of the DC removing resistances.

Second Example of Modification

Figure 8A:
FIGS. 8A and 8B are diagrams of general configuration of a variable capacitance device according to a second example of modification.
Figure 8B:
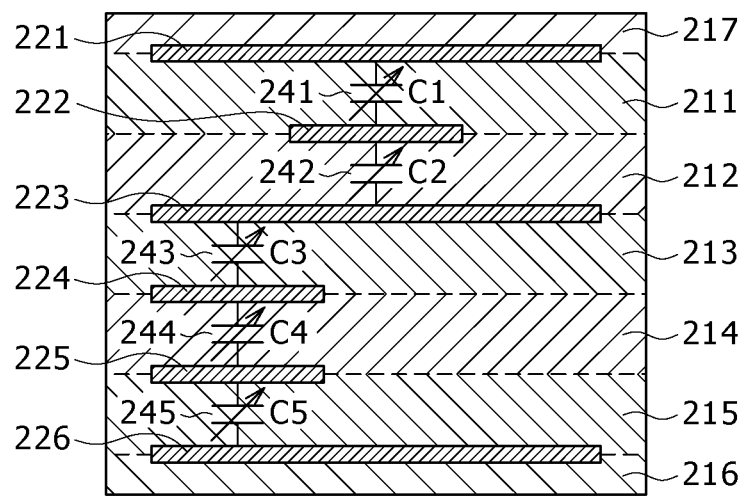

In a second example of modification, description will be made of another example of constitution in which five capacitors are connected in series with each other within a variable capacitance device. FIGS. 8A and 8B show a general configuration of a variable capacitance device according to the second example of modification. Incidentally, FIG. 8A is a schematic top view of the variable capacitance device according to the second example of modification, and FIG. 8B is a section view taken along a line C-C in FIG. 8A.

The variable capacitance device 200 according to the second example of modification includes a device body 210 and six external terminals 231 to 236 (hereinafter referred to as a first to a sixth external terminal, respectively). As in the foregoing embodiment, the device body 210 is formed by a rectangular parallelepiped member having a rectangular top surface 210a.

The first external terminal 231, the third external terminal 233, and the fifth external terminal 235 are formed on a side surface on one long side (upper side in FIG. 8A) of the top surface 210a of the device body 210. Incidentally, in this example, the first external terminal 231, the third external terminal 233, and the fifth external terminal 235 are arranged in this order at equal intervals from one short side (right side in FIG. 8A) to another short side on the side surface on one long side of the top surface 210a of the device body 210.

The second external terminal 232, the fourth external terminal 234, and the sixth external terminal 236 are formed on a side surface on another long side (lower side in FIG. 8A) of the top surface 210a of the device body 210. Incidentally, in this example, the sixth external terminal 236, the second external terminal 232, and the fourth external terminal 234 are arranged in this order at equal intervals from one short side (right side in FIG. 8A) to the other short side on the side surface on the other long side of the top surface 210a of the device body 210.

As shown in FIG. 8B, the device body 210 includes seven dielectric layers 211 to 217 (hereinafter referred to as a first to a fifth dielectric layer, a lower dielectric layer, and an upper dielectric layer, respectively) and six internal electrodes 221 to 226 (hereinafter referred to as a first to a sixth electrode, respectively).

The device body 210 is formed by laminating the sixth electrode 226, the fifth dielectric layer 215, the fifth electrode 225, the fourth dielectric layer 214, the fourth electrode 224, the third dielectric layer 213, and the third electrode 223 in order on the lower dielectric layer 216. Further, the device body 210 is formed by laminating the second dielectric layer 212, the second electrode 222, the first dielectric layer 211, the first electrode 221, and the upper dielectric layer 217 in order on the third electrode 223. In this example, the first to sixth electrodes 221 to 226 are connected to the first to sixth external terminals 231 to 236, respectively.

The configuration of each internal electrode will next be described. FIGS. 9A to 9F show general configurations of the first to sixth electrodes 221 to 226, respectively. Incidentally, FIGS. 9A to 9F are schematic top views of the first to sixth electrodes 221 to 226 formed on the respectively corresponding dielectric layers.

In this example, as shown in FIGS. 9A to 9F, the surfaces of the first to sixth electrodes 221 to 226 all have a rectangular shape as in the first example of modification. Incidentally, the surface shape of each internal electrode is not limited to the shape in this example, but can be changed as appropriate according to a form of arrangement of the external terminals and the shape of the device body 210, for example.

Figure 9A:
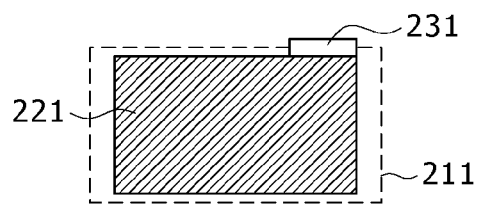
FIGS. 9A, 9B, 9C, 9D, 9E, and 9F are diagrams of general configuration of each internal electrode in the variable capacitance device according to the second example of modification.

As shown in FIG. 9A, the first electrode 221 is formed along a longitudinal direction of the first dielectric layer 211 so as to extend from the vicinity of one short side of the first dielectric layer 211 to the vicinity of another short side of the first dielectric layer 211. A part on one short side (right side in FIG. 9A) on one long side (upper long side in FIG. 9A) of the first electrode 221 is connected to the first external terminal 231.

Figure 9B:
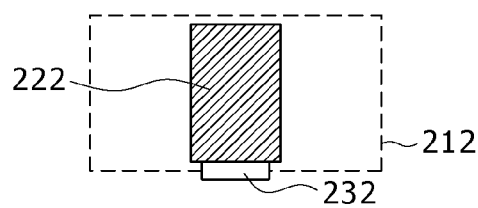

As shown in FIG. 9B, the second electrode 222 is formed along a lateral direction of the second dielectric layer 212 so as to extend from the vicinity of one long side of the second dielectric layer 212 to the vicinity of another long side of the second dielectric layer 212. One short side end part of the second electrode 222 is connected to the second external terminal 232.

Figure 9C:
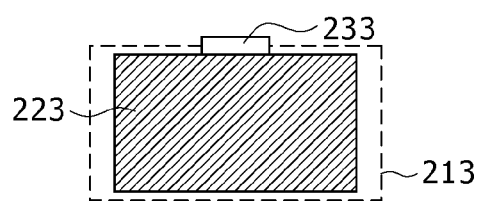

As shown in FIG. 9C, the third electrode 223 is formed along a longitudinal direction of the third dielectric layer 213 so as to extend from the vicinity of one short side of the third dielectric layer 213 to the vicinity of another short side of the third dielectric layer 213. A central part on one long side (upper long side in FIG. 9C) of the third electrode 223 is connected to the third external terminal 233.

Figure 9D:
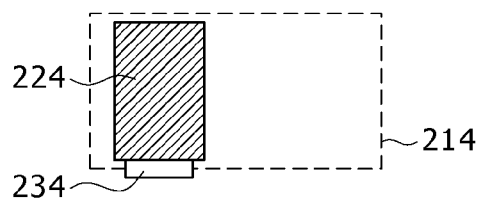

As shown in FIG. 9D, the fourth electrode 224 is formed along a lateral direction of the fourth dielectric layer 214 so as to extend from the vicinity of one long side of the fourth dielectric layer 214 to the vicinity of another long side of the fourth dielectric layer 214. One short side end part of the fourth electrode 224 is connected to the fourth external terminal 234.

Figure 9E:
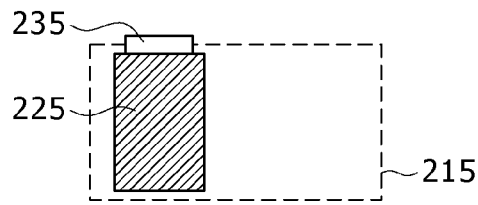

As shown in FIG. 9E, the fifth electrode 225 is formed along a lateral direction of the fifth dielectric layer 215 so as to extend from the vicinity of one long side of the fifth dielectric layer 215 to the vicinity of another long side of the fifth dielectric layer 215. One short side end part of the fifth electrode 225 is connected to the fifth external terminal 235.

Figure 9F:
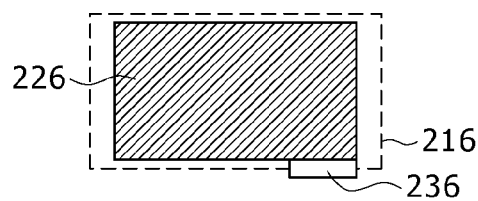

As shown in FIG. 9F, the sixth electrode 226 is formed along a longitudinal direction of the lower dielectric layer 216 so as to extend from the vicinity of one short side of the lower dielectric layer 216 to the vicinity of another short side of the lower dielectric layer 216. A part on one short side (right side in FIG. 9F) on another long side (lower long side in FIG. 9F) of the sixth electrode 226 is connected to the sixth external terminal 236.

Incidentally, to form a capacitor in each dielectric layer, each internal electrode is disposed at a position such that an opposing region is formed between the internal electrode and an adjacent internal electrode with the dielectric layer interposed between the internal electrodes. Incidentally, the variable capacitance device 200 in this example can be fabricated in a similar manner to that of the foregoing embodiment.

Being formed as described above, the first to fifth dielectric layers 211 to 215 have capacitors 241 to 245 (hereinafter referred to as a first to a fifth capacitor, respectively) of respective capacitances C1 to C5 formed therein. That is, also in the variable capacitance device 200 in this example, as in the first example of modification, one capacitor is provided in each dielectric layer (five capacitors in total), these capacitors are connected in series with each other, and further one external terminal is provided for each internal electrode.

In this example, the first to fifth capacitors 241 to 245 formed within the first to fifth dielectric layers 211 to 215, respectively, are all used as variable capacitance capacitors.

Incidentally, the constitution (for example a forming material, surface shape and dimensions, and thickness) of each dielectric layer can be made similar to the constitution of the dielectric layers used in the foregoing embodiment. In addition, the constitution (for example shape and dimensions) of each internal electrode is not limited to the examples shown in FIGS. 9A to 9F, but can be set appropriately in consideration of a use or a necessary capacitance, for example.

As described above, also in this example, as in the foregoing embodiment, one internal electrode is formed in each of an upper surface and a lower surface of one dielectric layer. Thus, as with the foregoing embodiment, the variable capacitance device 200 in this example can further increase the degree of freedom of design of the variable capacitance device, be manufactured easily, and suppress an effect of a parasitic capacitance occurring between internal electrodes.

Figure 10:
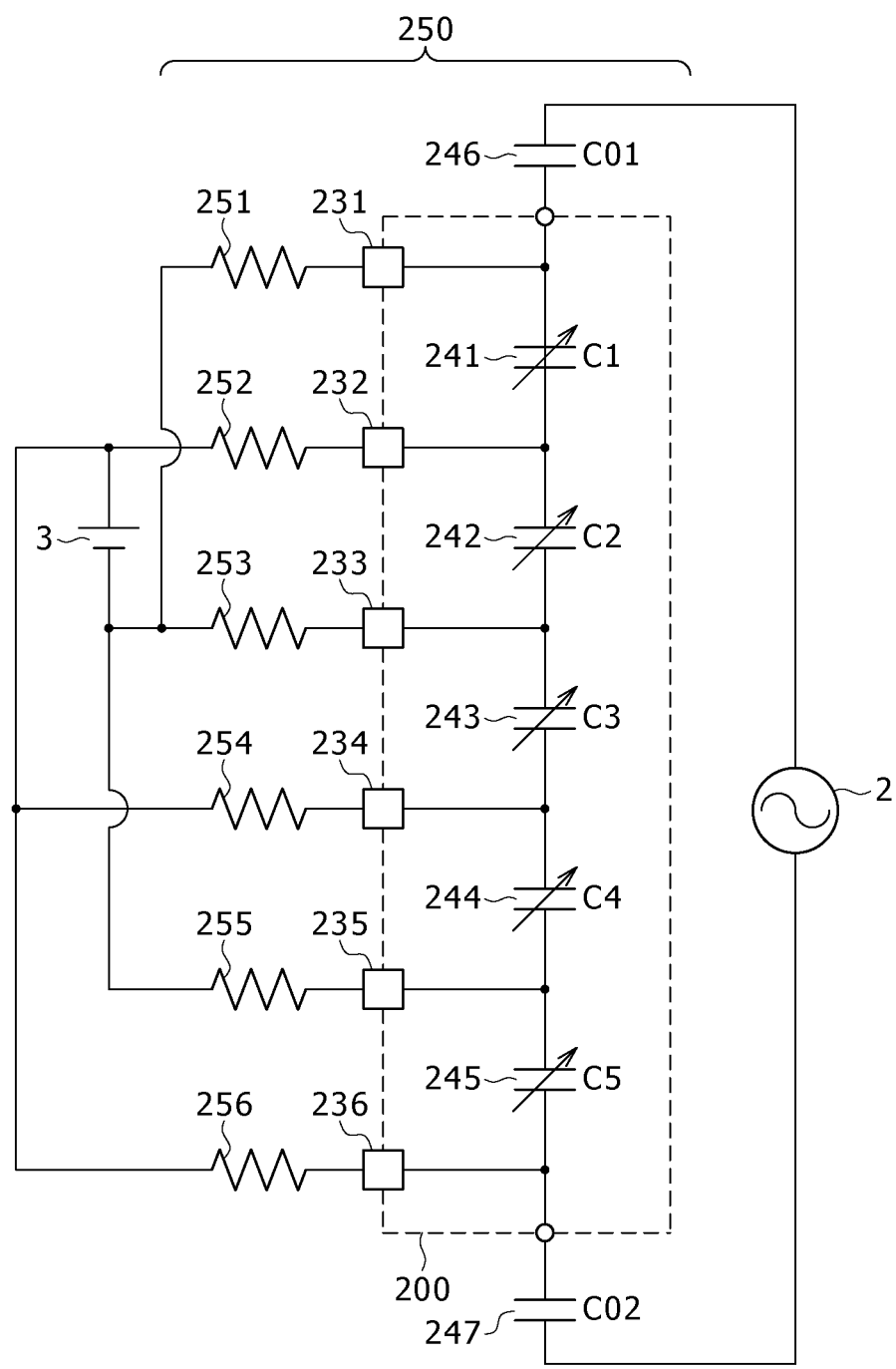
FIG. 10 is a diagram of general configuration of a voltage controlling circuit using the variable capacitance device according to the second example of modification.

FIG. 10 shows an example of configuration of a voltage controlling circuit using the variable capacitance device 200 in this example. Incidentally, terminals 231 to 236 in FIG. 10 respectively correspond to the first to sixth external terminals 231 to 236 of the variable capacitance device 200 in FIG. 8A.

The voltage controlling circuit 250 in this example includes the variable capacitance device 200, six DC removing resistances 251 to 256, and two DC removing capacitors 246 and 247 (fixed capacitance capacitors for removing a direct current). The variable capacitance device 200 in this example is represented by an equivalent circuit in which the first to fifth capacitors 241 to 245 are connected in series with each other in this order.

As described above, in this example, the first to fifth capacitors 241 to 245 are all used as variable capacitance capacitors. Thus, in this example, the DC removing capacitors 246 and 247 are prepared separately, and the DC removing capacitors are respectively connected to both terminals of the series circuit of the first to fifth capacitors 241 to 245.

Thus, in this example, terminals of the respective DC removing capacitors on opposite sides from the variable capacitance capacitors are connected to corresponding output terminals of an alternating-current power supply 2. That is, in the voltage controlling circuit 250 in this example, a series circuit formed by connecting the DC removing capacitor 246, the first to fifth capacitors 241 to 245, and the DC removing capacitor 247 in series with each other in this order is connected in parallel with the alternating-current power supply 2.

In addition, the second external terminal 232, the fourth external terminal 234, and the sixth external terminal 236 of the variable capacitance device 200 in this example are connected to the positive electrode terminal of a control power supply 3 via the DC removing resistances 252, 254, and 256, respectively. Further, the first external terminal 231, the third external terminal 233, and the fifth external terminal 235 are connected to the negative electrode terminal of the control power supply 3 via the DC removing resistances 251, 253, and 255, respectively. That is, also in this example, the control power supply 3 is connected in parallel with each of the first to fifth capacitors 241 to 245.

The voltage controlling circuit 250 in this example changes the respective capacitances of the first to fifth capacitors 241 to 245 by a control voltage input from the control power supply 3, and adjusts an alternating voltage input from the alternating-current power supply 2 to a circuit such as a rectifier circuit or the like (not shown) to a predetermined voltage value.

Incidentally, in this example, description has been made of an example in which the variable capacitance device 200 does not include the DC removing resistances 251 to 256 or the DC removing capacitors 246 and 247. However, the present application is not limited to this. The variable capacitance device 200 may include the DC removing resistances 251 to 256 and the DC removing capacitors 246 and 247. In addition, the variable capacitance device 200 may include either the DC removing resistances 251 to 256 or the DC removing capacitors 246 and 247. Further, in this example, DC removing inductors may be used in place of the DC removing resistances.

Third Example of Modification

Figure 11A:
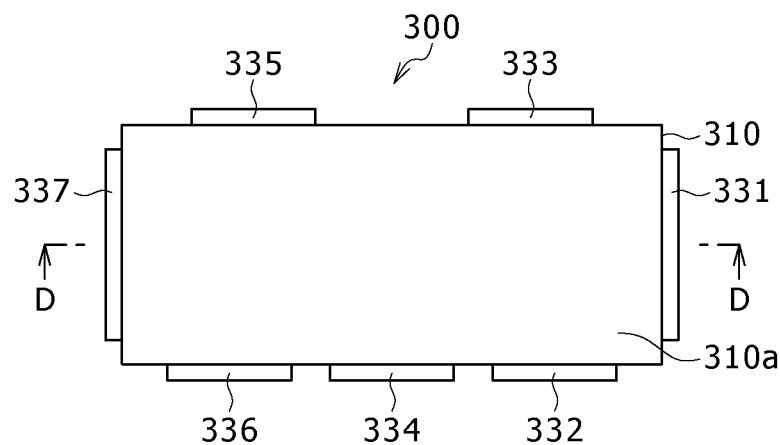
FIGS. 11A and 11B are diagrams of general configuration of a variable capacitance device according to a third example of modification.
Figure 11B:
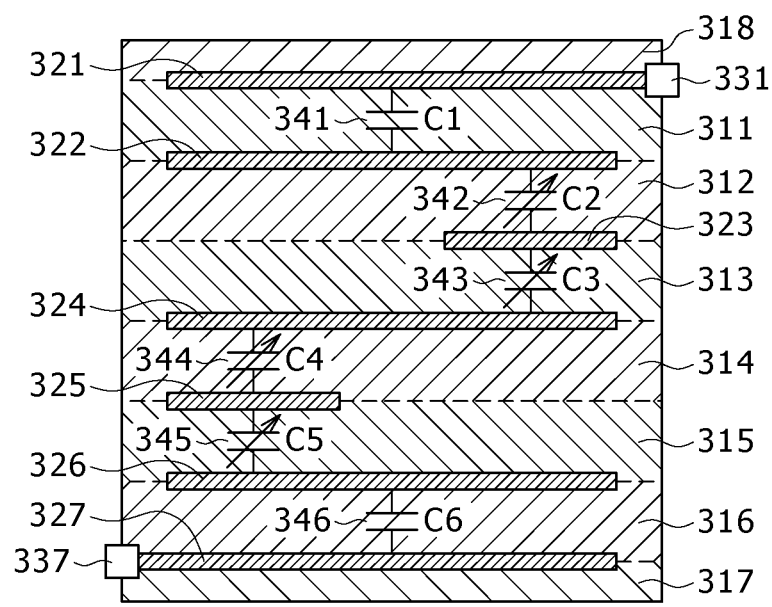

In a third example of modification, description will be made of an example of constitution in which six capacitors are connected in series with each other within a variable capacitance device. FIGS. 11A and 11B show a general configuration of a variable capacitance device according to the third example of modification. Incidentally, FIG. 11A is a schematic top view of the variable capacitance device according to the third example of modification, and FIG. 11B is a section view taken along a line D-D in FIG. 11A.

The variable capacitance device 300 according to the third example of modification includes a device body 310 and seven external terminals 331 to 337 (hereinafter referred to as a first to a seventh external terminal, respectively). As in the foregoing embodiment, the device body 310 is formed by a rectangular parallelepiped member having a rectangular top surface 310a.

The first external terminal 331 is formed on a side surface on one short side (right side in FIG. 11A) of the top surface 310a of the device body 310. The seventh external terminal 337 is formed on a side surface on another short side (left side in FIG. 11A) of the top surface 310a of the device body 310.

The third external terminal 333 and the fifth external terminal 335 are formed on a side surface on one long side (upper side in FIG. 11A) of the top surface 310a of the device body 310 along a direction of the long side in a state of being separated at a predetermined distance from each other. Incidentally, the third external terminal 333 and the fifth external terminal 335 are formed on the side of the first external terminal 331 and the side of the seventh external terminal 337, respectively, on the side surface on one long side of the top surface 310a of the device body 310.

The second external terminal 332, the fourth external terminal 334, and the sixth external terminal 336 are formed on a side surface on another long side (lower side in FIG. 11A) of the top surface 310a of the device body 310 along a direction of the long side in a state of being separated at a predetermined distance from each other. Incidentally, the fourth external terminal 334 is disposed at substantially a center on the side surface on the other long side of the top surface 310a of the device body 310. On the side surface on the other long side of the top surface 310a of the device body 310, the second external terminal 332 is disposed on the side of the first external terminal 331 relative to the fourth external terminal 334, and the sixth external terminal 336 is disposed on the side of the seventh external terminal 337 relative to the fourth external terminal 334.

As shown in FIG. 11B, the device body 310 includes eight dielectric layers 311 to 318 (hereinafter referred to as a first to a sixth dielectric layer, a lower dielectric layer, and an upper dielectric layer, respectively) and seven internal electrodes 321 to 327 (hereinafter referred to as a first to a seventh electrode, respectively).

The device body 310 is formed by laminating the seventh electrode 327, the sixth dielectric layer 316, the sixth electrode 326, the fifth dielectric layer 315, the fifth electrode 325, the fourth dielectric layer 314, the fourth electrode 324, the third dielectric layer 313, and the third electrode 323 in order on the lower dielectric layer 317. Further, the device body 310 is formed by laminating the second dielectric layer 312, the second electrode 322, the first dielectric layer 311, the first electrode 321, and the upper dielectric layer 318 in order on the third electrode 323. In this example, the first to seventh electrodes 321 to 327 are connected to the first to seventh external terminals 331 to 337, respectively.

The configuration of each internal electrode will next be described. FIGS. 12A to 12G show general configurations of the first to seventh electrodes 321 to 327, respectively. Incidentally, FIGS. 12A to 12G are schematic top views of the first to seventh electrodes 321 to 327 formed on the respectively corresponding dielectric layers.

In this example, as shown in FIGS. 12A to 12G, the surfaces of the first to seventh electrodes 321 to 327 all have a rectangular shape. Incidentally, the surface shape of each internal electrode is not limited to the shape in this example, but can be changed as appropriate according to a form of arrangement of the external terminals and the shape of the device body 310, for example.

Figure 12A:
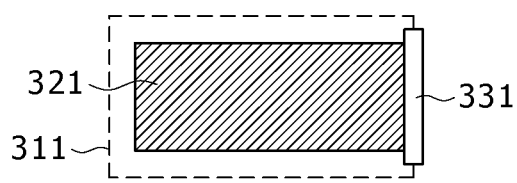
FIGS. 12A, 12B, 12C, 12D, 12E, 12F, and 12G are diagrams of general configuration of each internal electrode in the variable capacitance device according to the third example of modification.

As shown in FIG. 12A, the first electrode 321 is formed along a longitudinal direction of the first dielectric layer 311 so as to extend from the vicinity of one short side of the first dielectric layer 311 to the vicinity of another short side of the first dielectric layer 311. One short side end part of the first electrode 321 is connected to the first external terminal 331.

Figure 12E:
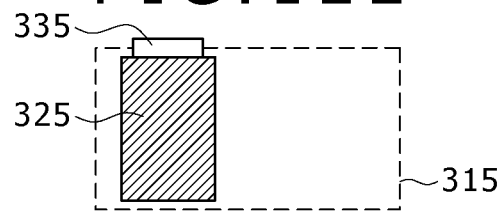
Figure 12B:
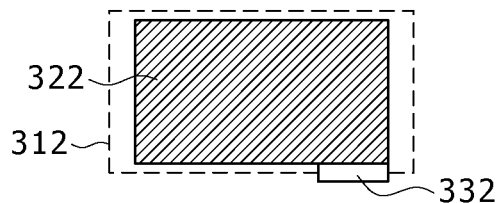

As shown in FIG. 12B, the second electrode 322 is formed along a longitudinal direction of the second dielectric layer 312 so as to extend from the vicinity of one short side of the second dielectric layer 312 to the vicinity of another short side of the second dielectric layer 312. A part on one short side (right side in FIG. 12B) on one long side (lower long side in FIG. 12B) of the second electrode 322 is connected to the second external terminal 332.

Figure 12F:
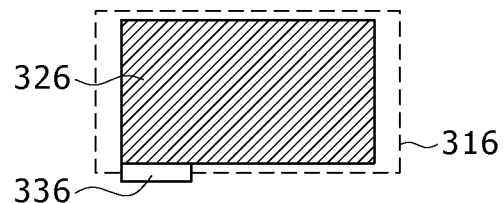
Figure 12C:
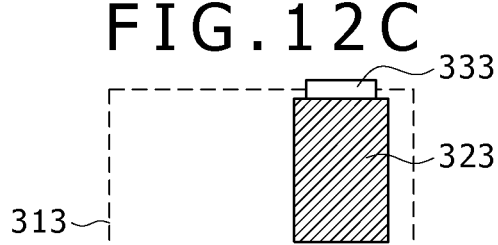

As shown in FIG. 12C, the third electrode 323 is formed along a lateral direction of the third dielectric layer 313 so as to extend from the vicinity of one long side of the third dielectric layer 313 to the vicinity of another long side of the third dielectric layer 313. One short side end part of the third electrode 323 is connected to the third external terminal 333.

Figure 12G:
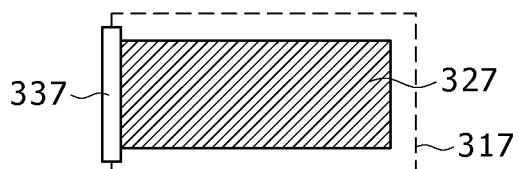
Figure 12D:
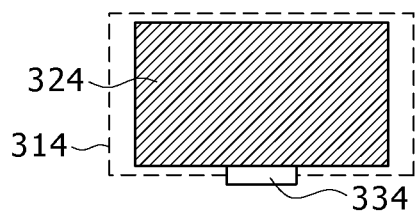

As shown in FIG. 12D, the fourth electrode 324 is formed along a longitudinal direction of the fourth dielectric layer 314 so as to extend from the vicinity of one short side of the fourth dielectric layer 314 to the vicinity of another short side of the fourth dielectric layer 314. A part around a center on one long side (lower long side in FIG. 12D) of the fourth electrode 324 is connected to the fourth external terminal 334.

As shown in FIG. 12E, the fifth electrode 325 is formed along a lateral direction of the fifth dielectric layer 315 so as to extend from the vicinity of one long side of the fifth dielectric layer 315 to the vicinity of another long side of the fifth dielectric layer 315. One short side end part of the fifth electrode 325 is connected to the fifth external terminal 335.

As shown in FIG. 12F, the sixth electrode 326 is formed along a longitudinal direction of the sixth dielectric layer 316 so as to extend from the vicinity of one short side of the sixth dielectric layer 316 to the vicinity of another short side of the sixth dielectric layer 316. A part on another short side (left side in FIG. 12F) on one long side (lower long side in FIG. 12F) of the sixth electrode 326 is connected to the sixth external terminal 336.

As shown in FIG. 12G, the seventh electrode 327 is formed along a longitudinal direction of the lower dielectric layer 317 so as to extend from the vicinity of one short side of the lower dielectric layer 317 to the vicinity of another short side of the lower dielectric layer 317. One short side end part of the seventh electrode 327 is connected to the seventh external terminal 337.

Incidentally, to form a capacitor in each dielectric layer, each internal electrode is disposed at a position such that an opposing region is formed between the internal electrode and an adjacent internal electrode with the dielectric layer interposed between the internal electrodes. Incidentally, the variable capacitance device 300 in this example can be fabricated in a similar manner to that of the foregoing embodiment.

Being formed as described above, the first to sixth dielectric layers 311 to 316 have capacitors 341 to 346 (hereinafter referred to as a first to a sixth capacitor, respectively) of respective capacitances C1 to C6 formed therein. That is, in the variable capacitance device 300 in this example, one capacitor is provided in each dielectric layer (six capacitors in total), these capacitors are connected in series with each other, and further one external terminal is provided for each internal electrode.

In this example, the second to fifth capacitors 342 to 345 formed within the second to fifth dielectric layers 312 to 315, respectively, are used as variable capacitance capacitors. The first capacitor 341 and the sixth capacitor 346 formed within the first dielectric layer 311 and the sixth dielectric layer 316, respectively, are used as DC removing capacitors.

Incidentally, the constitution (for example a forming material, surface shape and dimensions, and thickness) of each dielectric layer can be made similar to the constitution of the dielectric layers used in the foregoing embodiment. In addition, the constitution (for example shape and dimensions) of each internal electrode is not limited to the examples shown in FIGS. 12A to 12G, but can be set appropriately in consideration of a use or a necessary capacitance, for example.

As described above, also in this example, as in the foregoing embodiment, one internal electrode is formed in each of an upper surface and a lower surface of one dielectric layer. Thus, as with the foregoing embodiment, the variable capacitance device 300 in this example can further increase the degree of freedom of design of the variable capacitance device, be manufactured easily, and suppress an effect of a parasitic capacitance occurring between internal electrodes.

Figure 13:
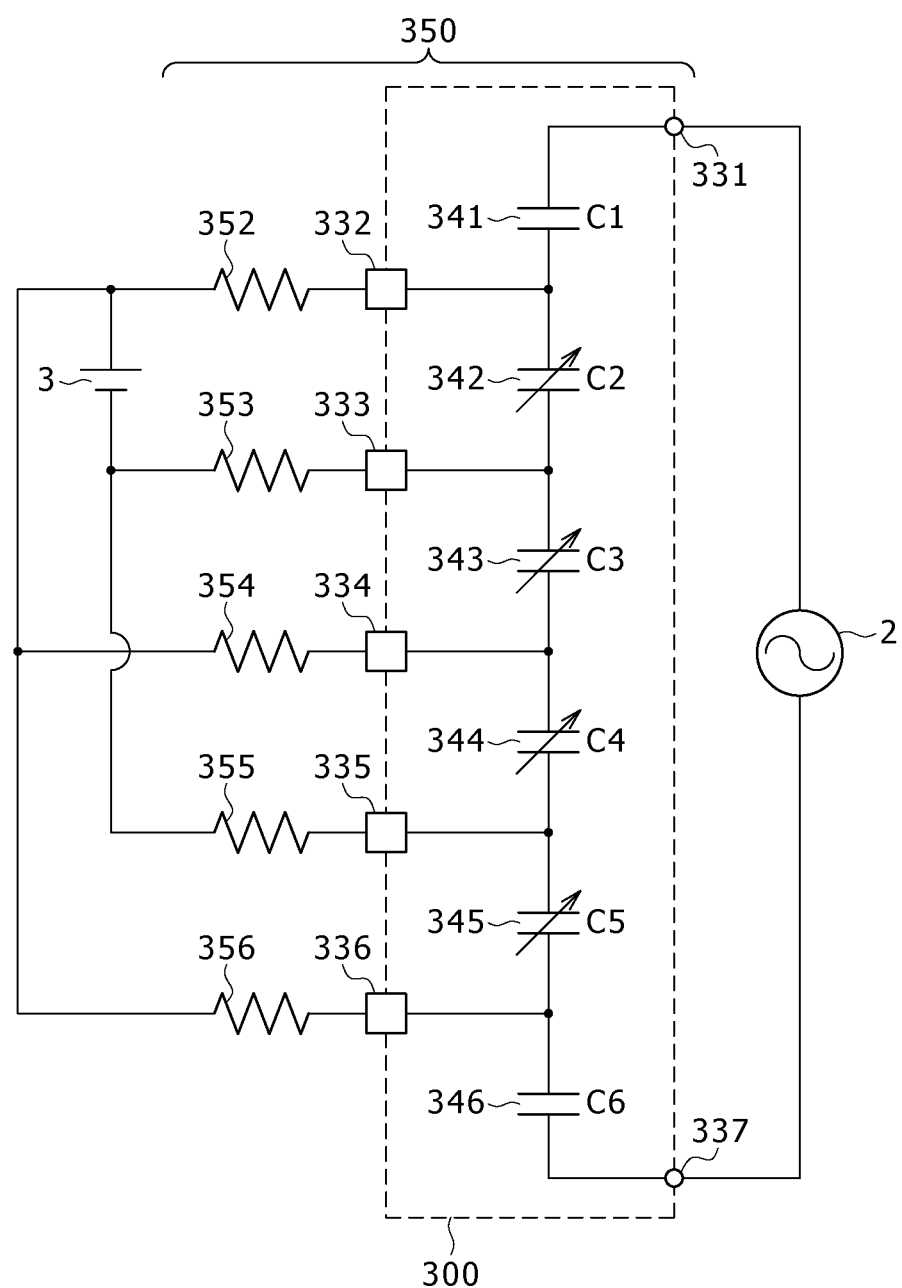
FIG. 13 is a diagram of general configuration of a voltage controlling circuit using the variable capacitance device according to the third example of modification.

FIG. 13 shows an example of configuration of a voltage controlling circuit using the variable capacitance device 300 in this example. Incidentally, terminals 331 to 337 in FIG. 13 respectively correspond to the first to seventh external terminals 331 to 337 of the variable capacitance device 300 in FIG. 11A.

The voltage controlling circuit 350 in this example includes the variable capacitance device 300 and five DC removing resistances 352 to 356. The variable capacitance device 300 in this example is represented by an equivalent circuit in which the first to sixth capacitors 341 to 346 are connected in series with each other in this order.

As described above, in this example, the second to fifth capacitors 342 to 345 are used as variable capacitance capacitors, and the first capacitor 341 and the sixth capacitor 346 are used as DC removing capacitors. Thus, in this example, the first external terminal 331 of the variable capacitance device 300 is connected to one output terminal of an alternating-current power supply 2, and the seventh external terminal 337 of the variable capacitance device 300 is connected to another output terminal of the alternating-current power supply 2. That is, the series circuit of the first to sixth capacitors 341 to 346 is connected in parallel with the alternating-current power supply 2.

In addition, the second external terminal 332, the fourth external terminal 334, and the sixth external terminal 336 in this example are connected to the positive electrode terminal of a control power supply 3 via the DC removing resistances 352, 354, and 356, respectively. Further, the third external terminal 333 and the fifth external terminal 335 are connected to the negative electrode terminal of the control power supply 3 via the DC removing resistances 353 and 355, respectively. That is, in the present example, the control power supply 3 is connected in parallel with each of the second to fifth capacitors 342 to 345.

The voltage controlling circuit 350 in this example changes the respective capacitances of the second to fifth capacitors 342 to 345 by a control voltage input from the control power supply 3, and adjusts an alternating voltage input from the alternating-current power supply 2 to a circuit such as a rectifier circuit or the like (not shown) to a predetermined voltage value.

Incidentally, in this example, description has been made of an example in which the variable capacitance device 300 does not include the DC removing resistances 352 to 356. However, the present application is not limited to this. The variable capacitance device 300 may include the DC removing resistances 352 to 356. In addition, in this example, DC removing inductors may be used in place of the DC removing resistances.

Fourth Example of Modification

In the foregoing embodiment and the first and third examples of modification, description has been made of examples in which a DC removing capacitor is formed by one dielectric layer within the variable capacitance devices. However, the present application is not limited to this. For uses that need a DC removing capacitor of a higher capacitance, the DC removing capacitor is desirably formed by a plurality of dielectric layers to increase the capacitance of the DC removing capacitor. An example thereof will be described in a fourth example of modification. In this example, however, a DC removing capacitor is formed by a plurality of dielectric layers in the variable capacitance device 300 described in the foregoing third example of modification.

Figure 14A:
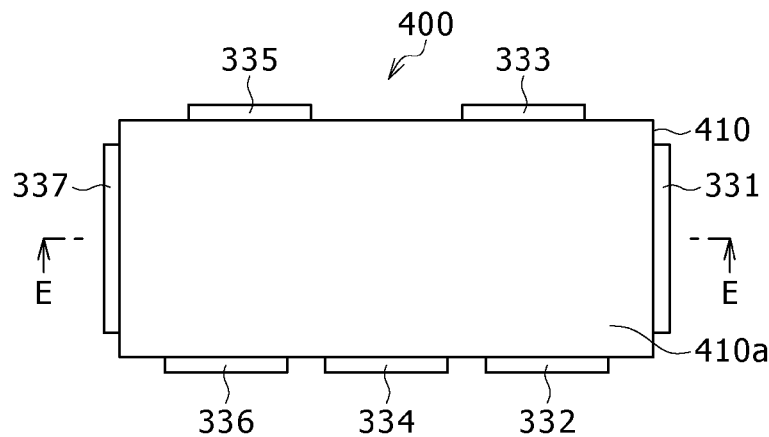
FIGS. 14A and 14B are diagrams of general configuration of a variable capacitance device according to a fourth example of modification.
Figure 14B:
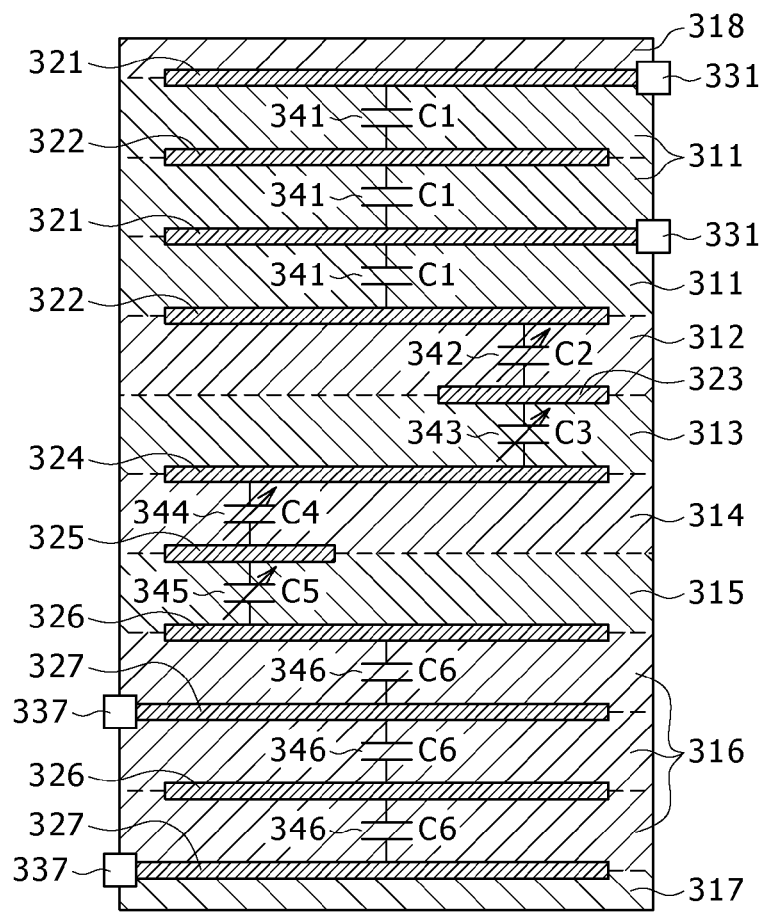

FIGS. 14A and 14B show a general configuration of a variable capacitance device according to the fourth example of modification. Incidentally, FIG. 14A is a schematic top view of the variable capacitance device according to the fourth example of modification, and FIG. 14B is a section view taken along a line E-E in FIG. 14A. Incidentally, in FIGS. 14A and 14B, similar constituent elements to those of the foregoing third example of modification (FIGS. 11A and 11B) are identified by the same reference numerals.

The variable capacitance device 400 according to the fourth example of modification includes a device body 410 and a first to a seventh external terminal 331 to 337. As in the foregoing embodiment, the device body 410 is formed by a rectangular parallelepiped member having a rectangular top surface 410a. The first to seventh external terminals 331 to 337 are similar to those of the foregoing third example of modification.

In the device body 410 in this example, the configurations of the DC removing capacitors connected to the second capacitor 342 and the fifth capacitor 345, respectively, are different from the third example of modification. Other configurations are similar to those of the third example of modification. Thus, description in the following will be made of only the configurations of the DC removing capacitors connected to the second capacitor 342 and the fifth capacitor 345, respectively.

In the device body 410 in this example, as shown in FIG. 14B, the DC removing capacitor formed between the second dielectric layer 312 and the upper dielectric layer 318 is composed of three first dielectric layers 311, two first electrodes 321, and two second electrodes 322. Specifically, the DC removing capacitor is made by forming the second electrode 322, the first dielectric layer 311, the first electrode 321, the first dielectric layer 311, the second electrode 322, the first dielectric layer 311, and the first electrode 321 in this order on the second dielectric layer 312. Incidentally, the number of first dielectric layers 311, first electrodes 321, and second electrodes 322 constituting the DC removing capacitor formed between the second dielectric layer 312 and the upper dielectric layer 318 is not limited to this example, but is set appropriately according to a use, for example.

As shown in FIG. 14B, the DC removing capacitor formed between the fifth dielectric layer 315 and the lower dielectric layer is composed of three sixth dielectric layers 316, two sixth electrodes 326, and two seventh electrodes 327. Specifically, the DC removing capacitor is made by forming the seventh electrode 327, the sixth dielectric layer 316, the sixth electrode 326, the sixth dielectric layer 316, the seventh electrode 327, the sixth dielectric layer 316, and the sixth electrode 326 in this order on the lower dielectric layer 317. Incidentally, the number of sixth dielectric layers 316, sixth electrodes 326, and seventh electrodes 327 constituting the DC removing capacitor formed between the fifth dielectric layer 315 and the lower dielectric layer is not limited to this example, but is set appropriately according to a use, for example.

FIGS. 15A to 15K show the configurations of the internal electrodes formed on the respective dielectric layers in this example. Incidentally, FIGS. 15A to 15K are schematic top views of the first electrode 321, the second electrode 322, the first to seventh electrodes 321 to 327, the sixth electrode 326, and the seventh electrode 327 formed on the respectively corresponding dielectric layers.

As is clear from comparison between the configurations of the first to seventh electrodes 321 to 327 in this example which electrodes are shown in FIGS. 15A to 15K and the electrodes of the third example of modification which electrodes are shown in FIGS. 12A to 12G, the configurations of the first to seventh electrodes 321 to 327 in this example are similar to those of the third example of modification.

Figure 15A:
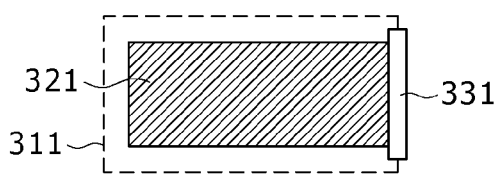
FIGS. 15A, 15B, 15C, 15D, 15E, 15F, 15G, 15H, 15I, 15J, and 15K are diagrams of general configuration of each internal electrode in the variable capacitance device according to the fourth example of modification.
Figure 15G:
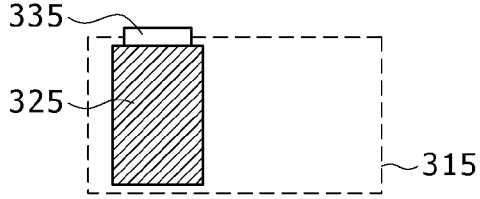
Figure 15B:
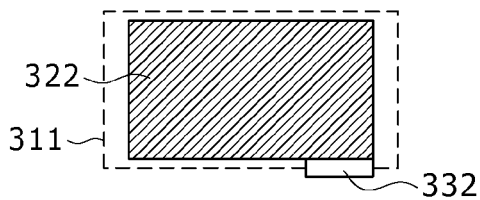
Figure 15H:
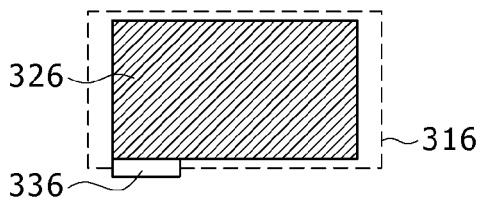
Figure 15C:
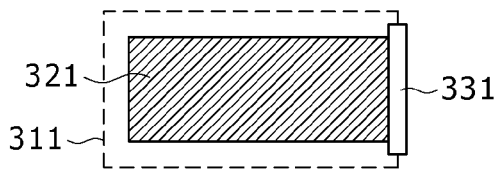
Figure 15I:
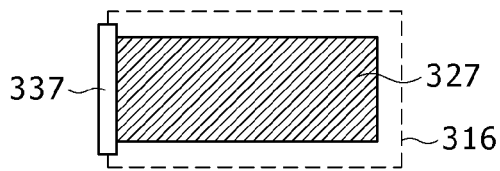
Figure 15D:
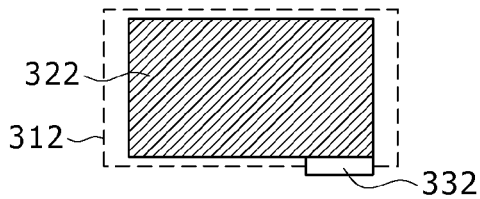

In this example, however, the two first electrodes 321 formed between the second dielectric layer 312 and the upper dielectric layer 318 are both connected to the first external terminal 331, as shown in FIGS. 15A and 15C. In addition, the two second electrodes 322 formed between the second dielectric layer 312 and the upper dielectric layer 318 are both connected to the second external terminal 332, as shown in FIGS. 15B and 15D. That is, in this example, the DC removing capacitor connected to the second capacitor 342 is formed by connecting three first capacitors 341 (capacitor group) of a capacitance C1 which capacitors are respectively formed in the three first dielectric layers 311 in parallel with each other.

Figure 15J:
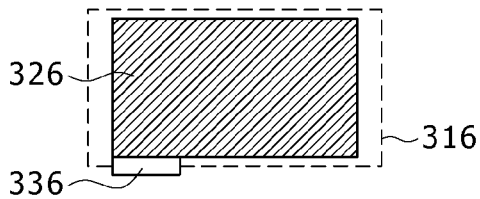
Figure 15E:
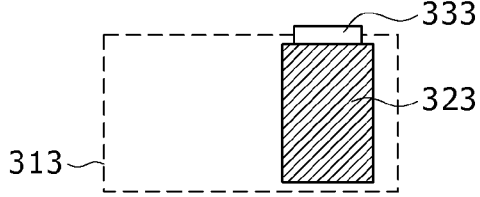
Figure 15K:
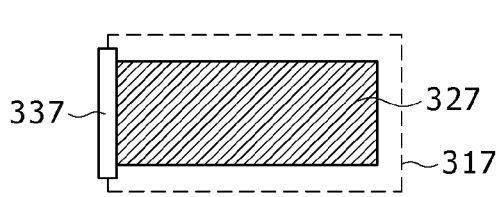
Figure 15F:
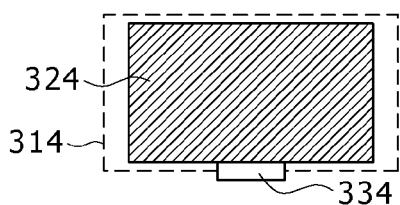

Further, in this example, the two sixth electrodes 326 formed between the fifth dielectric layer 315 and the lower dielectric layer 317 are both connected to the sixth external terminal 336, as shown in FIGS. 15H and 15J. In addition, the two seventh electrodes 327 formed between the fifth dielectric layer 315 and the lower dielectric layer 317 are both connected to the seventh external terminal 337, as shown in FIGS. 15I and 15K. That is, in this example, the DC removing capacitor connected to the fifth capacitor 345 is formed by connecting three sixth capacitors 346 of a capacitance C6 which capacitors are respectively formed in the three sixth dielectric layers 316 in parallel with each other. Incidentally, in the constitution of the variable capacitance device 400 in this example, the capacitances of the respective variable capacitance capacitors are determined by the areas of the third electrode 323 and the fifth electrode 325.

Figure 16:
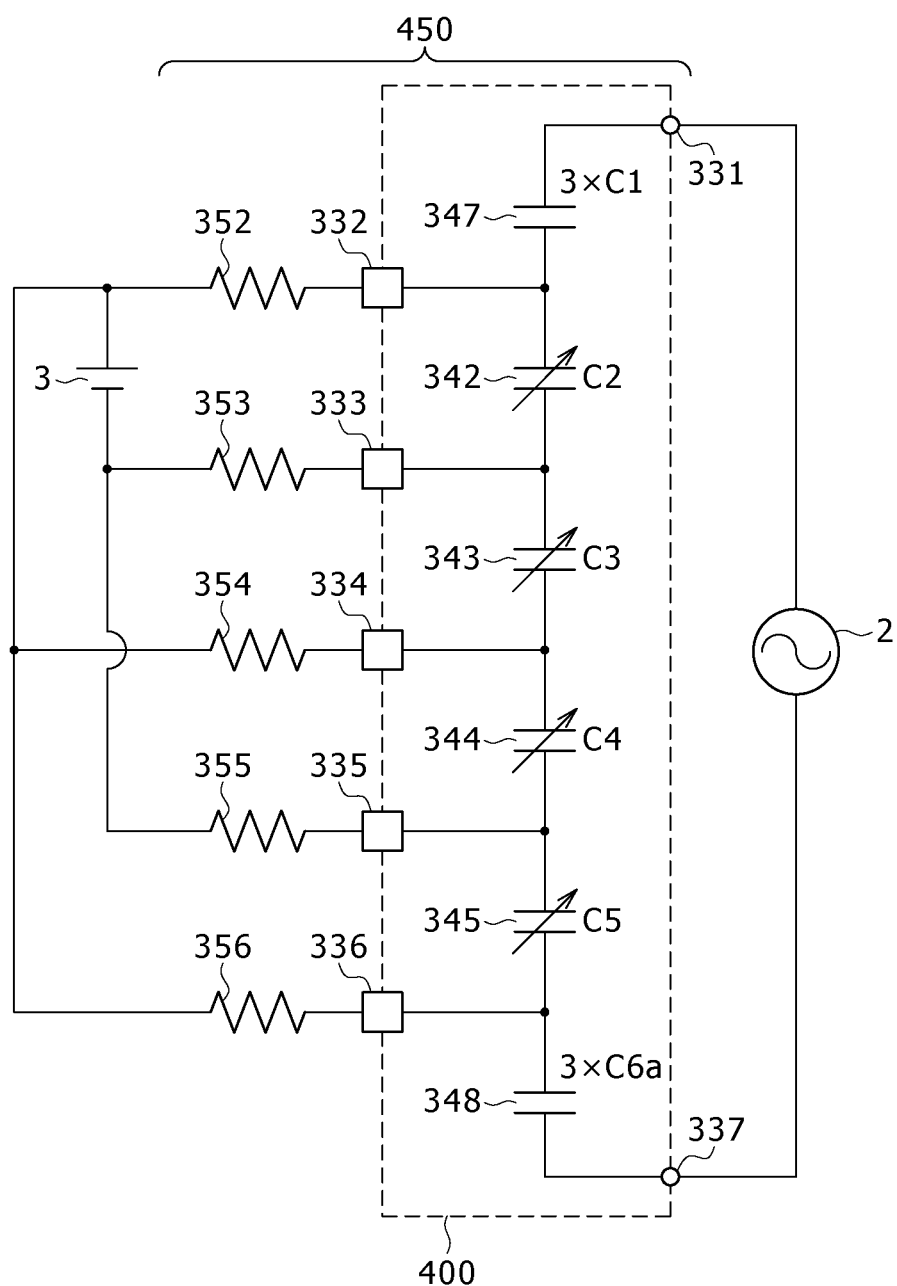
FIG. 16 is a diagram of general configuration of a voltage controlling circuit using the variable capacitance device according to the fourth example of modification.

FIG. 16 shows an example of configuration of a voltage controlling circuit using the variable capacitance device 400 in this example. Incidentally, terminals 331 to 337 in FIG. 16 respectively correspond to the first to seventh external terminals 331 to 337 of the variable capacitance device 400 in FIG. 14A.

The voltage controlling circuit 450 in this example includes the variable capacitance device 400 and five DC removing resistances 352 to 356.

As described above, in this example, the DC removing capacitor connected to the second capacitor 342 is formed by connecting the three first capacitors 341 of the capacitance C1 in parallel with each other. In addition, in this example, the DC removing capacitor connected to the fifth capacitor 345 is formed by connecting the three sixth capacitors 346 of the capacitance C6 in parallel with each other. Thus, the variable capacitance device 400 in this example is represented by an equivalent circuit in which a DC removing capacitor 347 of a capacitance 3×C1, the second to fifth capacitors 342 to 345, and a DC removing capacitor 348 of a capacitance 3×C6 are connected in series with each other in this order. Other configurations than that of this series circuit are similar to those of the voltage controlling circuit 350 in the third example of modification.

As described above, also in this example, as in the foregoing embodiment, one internal electrode is formed in each of an upper surface and a lower surface of one dielectric layer. Thus, as with the foregoing embodiment, the variable capacitance device 400 in this example can further increase the degree of freedom of design of the variable capacitance device, be manufactured easily, and suppress an effect of a parasitic capacitance occurring between internal electrodes.

Further, with the constitution in this example, the capacitance of the DC removing capacitors can be changed easily according to a use, for example. Thus, this example can further increase the degree of freedom of design. In particular, in this example, the capacitance of the DC removing capacitors can be increased easily. Thus, the constitution in this example is for example suitable for a use where the capacitance of the DC removing capacitors needs to be about 10 or more times the capacitance of the variable capacitance capacitors.

Incidentally, in this example, description has been made of an example in which the variable capacitance device 400 does not include the DC removing resistances 352 to 356. However, the present application is not limited to this. The variable capacitance device 400 may include the DC removing resistances 352 to 356. In addition, in this example, DC removing inductors may be used in place of the DC removing resistances.

Fifth Example of Modification

The variable capacitance devices according to the foregoing embodiment and the various examples of modification are suitable mainly for uses that need a low capacitance and low-voltage driving, but may not provide sufficient variable capacitance characteristics for uses that need a relatively high capacitance.

Thus, for such uses, it suffices to set each of the variable capacitance devices according to the foregoing embodiment and the various examples of modification as a variable capacitance element of one unit, prepare a plurality of units, and connect the plurality of units in parallel with each other. An example of such a constitution will be described in a fifth example of modification. Incidentally, in this example, description will be made of an example in which two units of the variable capacitance device according to the foregoing embodiment are connected in parallel with each other.

Figure 17A:
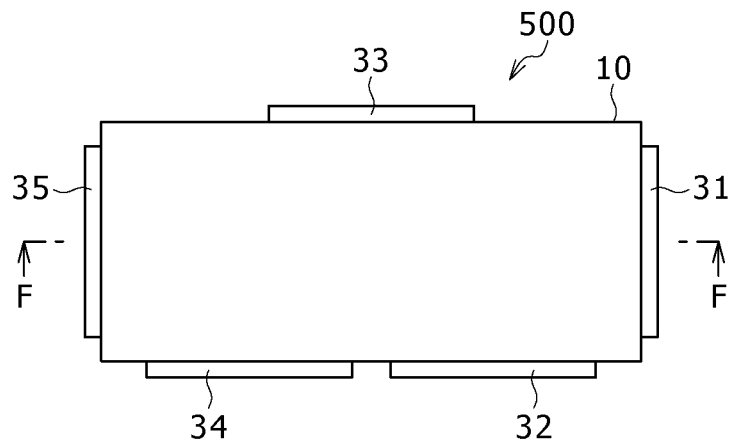
FIGS. 17A and 17B are diagrams of general configuration of a variable capacitance device according to a fifth example of modification.
Figure 17B:
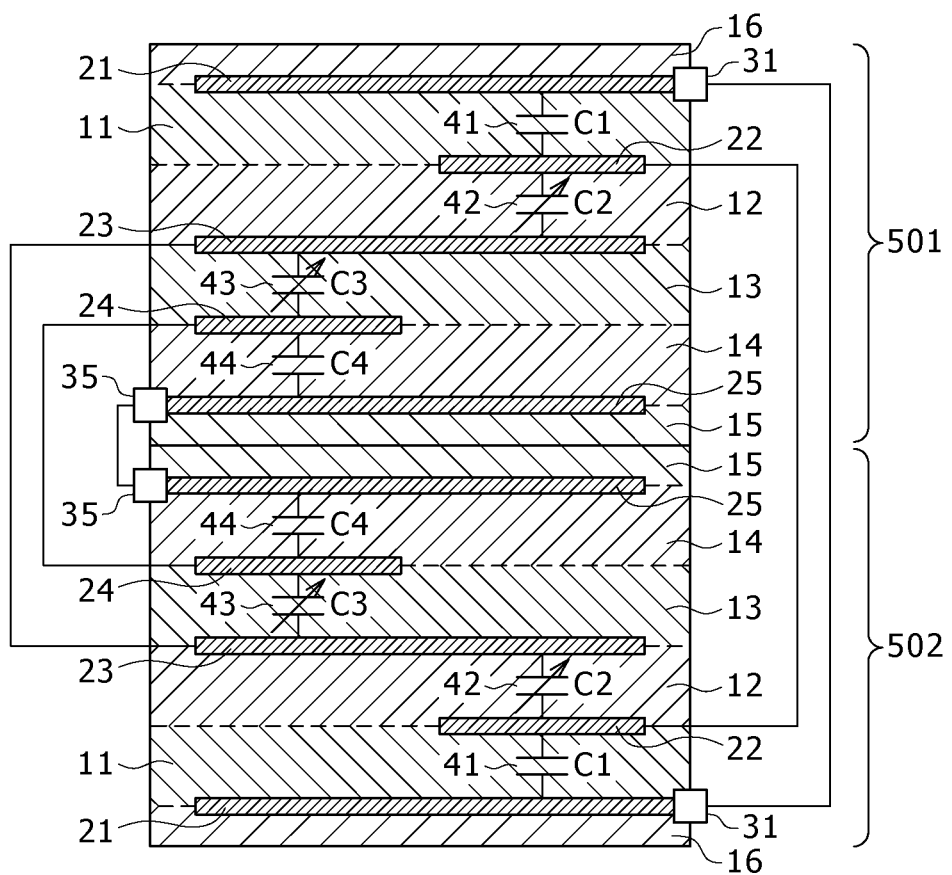

FIGS. 17A and 17B show a general configuration of a variable capacitance device according to the fifth example of modification. Incidentally, FIG. 17A is a schematic top view of the variable capacitance device according to the fifth example of modification, and FIG. 17B is a section view taken along a line F-F in FIG. 17A. Incidentally, in FIGS. 17A and 17B, similar constituent elements to those of the foregoing embodiment (FIGS. 1A and 1B) are identified by the same reference numerals.

As shown in FIG. 17B, the variable capacitance device 500 in this example includes two units 501 and 502 (hereinafter referred to as a first unit and a second unit). Each unit is formed by the variable capacitance device 1 according to the foregoing embodiment (FIGS. 1A and 1B).

In this example, a first to a fifth electrode 21 to 25 within each unit are connected to a first to a fifth external terminal 31 to 35, respectively. That is, the first to fifth electrodes 21 to 25 of the first unit 501 and the first to fifth electrodes 21 to 25 of the second unit 502 are respectively connected to each other. With such a configuration, the first unit 501 and the second unit 502 are connected in parallel with each other.

In addition, in this example, the first unit 501 is laminated onto the second unit 502 such that the lower dielectric layer 15 of the first unit 501 and the lower dielectric layer 15 of the second unit 502 are opposed to each other. That is, internal electrodes to which signals of the same polarity are applied are opposed to each other at a boundary between the first unit 501 and the second unit 502. This prevents occurrence of a parasitic capacitance between the first unit 501 and the second unit 502.

Incidentally, a constitution when a plurality of units are laminated is not limited to the constitution in this example. For example, the first unit 501 may be laminated onto the second unit 502 such that the lower dielectric layer 15 of the first unit 501 and the upper dielectric layer 16 of the second unit 502 are opposed to each other. In this case, however, internal electrodes to which signals of different polarities are applied are opposed to each other at the boundary between the first unit 501 and the second unit 502. Thus, in this case, a dummy dielectric layer is desirably inserted between the first unit 501 and the second unit 502 to suppress occurrence of a parasitic capacitance between the first unit 501 and the second unit 502.

As described above, the variable capacitance device 500 in this example is formed by laminating the two units 501 and 502 composed of the variable capacitance device 1 according to the foregoing embodiment. Thus, the variable capacitance device 500 provides similar effects to those of the foregoing embodiment. Further, with the constitution in this example, the variable capacitance device 500 is formed by connecting the two units 501 and 502 each composed of the variable capacitance device 1 according to the foregoing embodiment in parallel with each other, as described above. Thus, the total capacitance of the variable capacitance device 500 can be increased easily, and provision can be made for a use that needs a relatively high capacitance.

Sixth Example of Modification

In the foregoing embodiment and the various examples of modification, description has been made of an example in which one capacitor is formed in each dielectric layer. However, the present application is not limited to this. A plurality of capacitors may be formed in one dielectric layer when the size of an internal electrode forming surface in a variable capacitance device can be made sufficiently large. An example of such a constitution will be described in a sixth example of modification. Incidentally, in this example, description will be made of an example in which four capacitors are connected in series with each other within one variable capacitance device as in the existing variable capacitance device described with reference to FIGS. 21A and 21B, for example.

Figure 18:
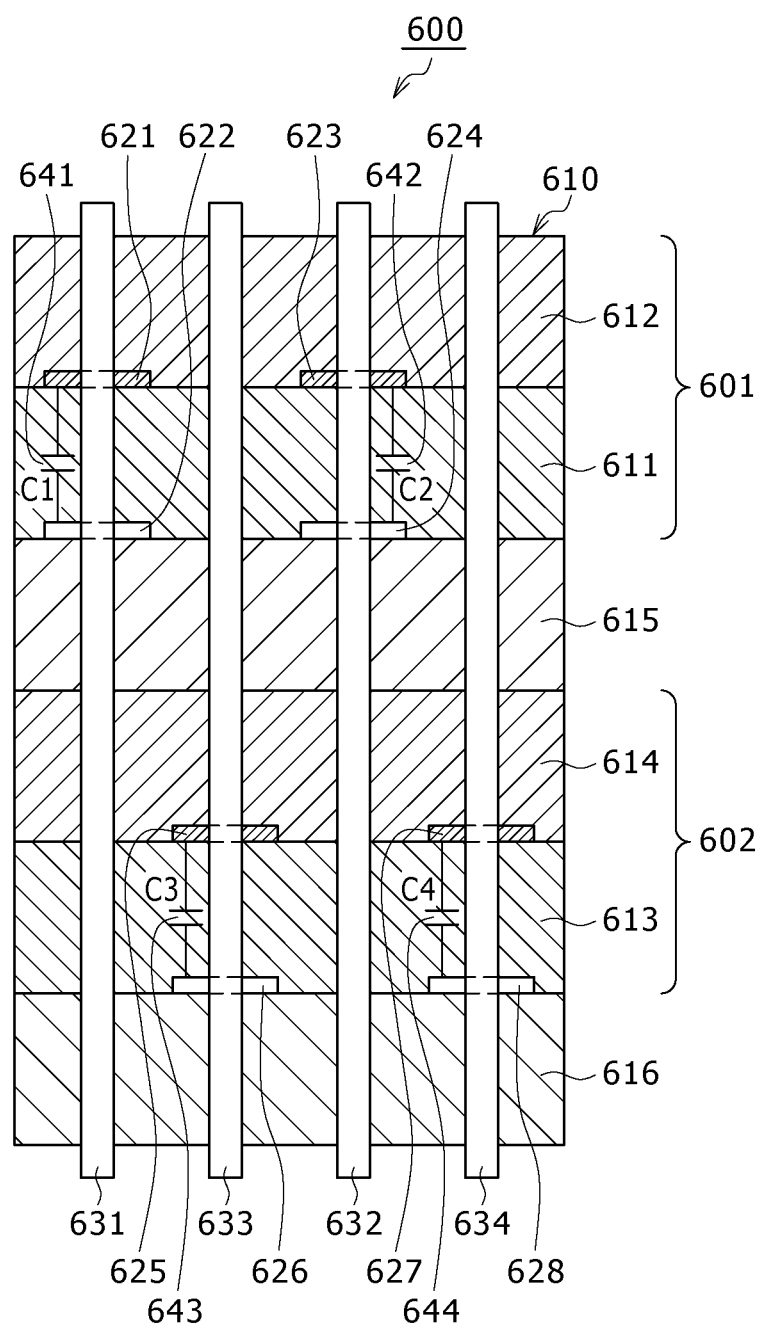
FIG. 18 is a diagram of general configuration of a variable capacitance device according to a sixth example of modification.

FIG. 18 shows a general configuration of a variable capacitance device in this example. Incidentally, FIG. 18 is a schematic side view of the variable capacitance device in this example.

The variable capacitance device 600 in this example includes a device body 610 in the form of a rectangular parallelepiped and eight external terminals 631 to 638 formed in side surfaces of the device body 610 (a first to an eighth external terminal: see FIGS. 19A and 19B to be described later).

Incidentally, in this example, the first external terminal 631, the third external terminal 633, the second external terminal 632, and the fourth external terminal 634 are arranged in this order at equal intervals in one side surface of the device body 610 along a face direction of dielectric layers. The fifth to eighth external terminals 635 to 638 are formed in the side surface of the device body 610 opposite from the side surface in which the first to fourth external terminals 631 to 634 are formed. The fifth to eighth external terminals 635 to 638 are arranged in a position opposed to the first to fourth external terminals 631 to 634, respectively, with the device body 610 interposed therebetween (see FIGS. 19A and 19B to be described later).

The device body 610 includes a first dielectric section 601, a second dielectric section 602, a dummy dielectric layer 615, and a protective dielectric layer 616. The dummy dielectric layer 615 is provided between the first dielectric section 601 and the second dielectric section 602 to suppress a parasitic capacitance between the first dielectric section 601 and the second dielectric section 602. The protective dielectric layer 616 is provided on a surface of the second dielectric section 602 on an opposite side from the dummy dielectric layer 615 side.

The first dielectric section 601 includes a first dielectric layer 611, a second dielectric layer 612, a first upper electrode 621, a first lower electrode 622, a second upper electrode 623, and a second lower electrode 624. The first dielectric layer 611 and the second dielectric layer 612 are laminated on the dummy dielectric layer 615 in this order.

The first upper electrode 621 and the second upper electrode 623 (internal electrode section) are formed in a state of being separated at a predetermined distance from each other on a surface of the first dielectric layer 611 on the side of the second dielectric layer 612. The first lower electrode 622 and the second lower electrode 624 (internal electrode section) are formed in a surface of the first dielectric layer 611 on the side of the dummy dielectric layer 615. The first lower electrode 622 and the second lower electrode 624 are arranged in a position opposed to the first upper electrode 621 and the second upper electrode 623, respectively, with the first dielectric layer 611 interposed therebetween.

With such a constitution, the first dielectric section 601 has a first capacitor 641 formed therein between the first upper electrode 621 and the first lower electrode 622, and has a second capacitor 642 formed therein between the second upper electrode 623 and the second lower electrode 624.

The second dielectric section 602 includes a third dielectric layer 613, a fourth dielectric layer 614, a third upper electrode 625, a third lower electrode 626, a fourth upper electrode 627, and a fourth lower electrode 628. The third dielectric layer 613 and the fourth dielectric layer 614 are laminated on the protective dielectric layer 616 in this order.

The third upper electrode 625 and the fourth upper electrode 627 are formed in a state of being separated at a predetermined distance from each other on a surface of the third dielectric layer 613 on the side of the fourth dielectric layer 614. The third lower electrode 626 and the fourth lower electrode 628 are formed in a surface of the third dielectric layer 613 on the side of the protective dielectric layer 616. The third lower electrode 626 and the fourth lower electrode 628 are arranged in a position opposed to the third upper electrode 625 and the fourth upper electrode 627, respectively, with the third dielectric layer 613 interposed therebetween.

With such a constitution, the second dielectric section 602 has a third capacitor 643 formed therein between the third upper electrode 625 and the third lower electrode 626, and has a fourth capacitor 644 formed therein between the fourth upper electrode 627 and the fourth lower electrode 628.

Incidentally, in this example, the internal electrodes are arranged in a position such that the capacitors do not overlap each other in a direction of lamination of the dielectric layers (vertical direction in FIG. 18). In addition, the dielectric layers and internal electrodes of the variable capacitance device 600 can be formed of materials similar to those of the dielectric layers and internal electrodes of the foregoing embodiment.

Description will next be made of connection relation of the internal electrodes in the variable capacitance device 600 in this example. FIGS. 19A and 19B show a general configuration of the internal electrodes in this example. Incidentally, FIG. 19A is a top perspective view of the first dielectric section 601, and FIG. 19B is a top perspective view of the second dielectric section 602.

Figure 19A:
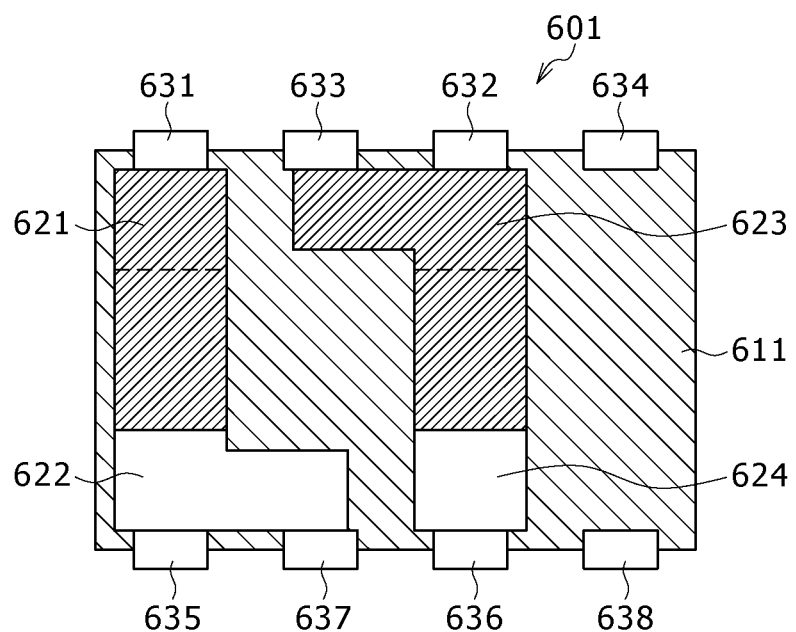
FIGS. 19A and 19B are diagrams of general configuration of each internal electrode in the variable capacitance device according to the sixth example of modification.

As shown in FIG. 19A, the first upper electrode 621 has a rectangular surface, and is formed so as to extend along a lateral direction of the first dielectric layer 611. One short side end part of the first upper electrode 621 is connected to the first external terminal 631. Incidentally, the extending length of the first upper electrode 621 is set such that the first upper electrode 621 is opposed to the first lower electrode 622 in a predetermined opposing area.

As shown in FIG. 19A, the first lower electrode 622 has an L-shaped surface. One side part of the first lower electrode 622 extends along a longitudinal direction of the first dielectric layer 611. Another side part of the first lower electrode 622 extends along the lateral direction of the first dielectric layer 611. In this example, one side part of the first lower electrode 622 which side part extends along the longitudinal direction of the first dielectric layer 611 is connected to the fifth external terminal 635 and the seventh external terminal 637.

Incidentally, the width of one side part of the first lower electrode 622 in a direction orthogonal to the extending direction of one side part of the first lower electrode 622 is made smaller than a shortest distance between the first upper electrode 621 and the fifth external terminal 635. By thus setting the width of one side part of the first lower electrode 622, the first upper electrode 621 and one side part of the first lower electrode 622 are prevented from being opposed to each other even when the group of the lower electrodes (or the group of the upper electrodes) is shifted in the longitudinal direction of the first dielectric layer 611 at a time of lamination. In this case, variation between capacitors in amount of change in capacitance of each capacitor which change is attendant on a positional shift of the lower electrode group (or the upper electrode group) can be suppressed.

Further, in this example, as shown in FIG. 19A, a part of the long side part of the seventh external terminal 637 on the first dielectric layer 611 side and one side part of the first lower electrode 622 are connected to each other. That is, the first lower electrode 622 is not connected to a part on the second lower electrode 624 side of the long side part on the first dielectric layer 611 side of the seventh external terminal 637. This is to suppress a parasitic capacitance between the first lower electrode 622 and the second lower electrode 624 by increasing a distance between the first lower electrode 622 and the second lower electrode 624.

The other side part of the first lower electrode 622 extends from the fifth external terminal 635 to the first external terminal 631. The extending length of the other side part of the first lower electrode 622 is set such that the first lower electrode 622 is opposed to the first upper electrode 621 in a predetermined opposing area.

As shown in FIG. 19A, the second upper electrode 623 has an L-shaped surface. One side part of the second upper electrode 623 extends along the longitudinal direction of the first dielectric layer 611. Another side part of the second upper electrode 623 extends along the lateral direction of the first dielectric layer 611. In this example, one side part of the second upper electrode 623 which side part extends along the longitudinal direction of the first dielectric layer 611 is connected to the second external terminal 632 and the third external terminal 633.

Incidentally, the width of one side part of the second upper electrode 623 in a direction orthogonal to the extending direction of one side part of the second upper electrode 623 is made smaller than a shortest distance between the second lower electrode 624 to be described later and the second external terminal 632. Further, in this example, a part of the long side part on the first dielectric layer 611 side of the third external terminal 633 and one side part of the second upper electrode 623 are connected to each other.

The other side part of the second upper electrode 623 extends from the second external terminal 632 to the sixth external terminal 636. The extending length of the other side part of the second upper electrode 623 is set such that the second upper electrode 623 is opposed to the second lower electrode 624 in a predetermined opposing area.

As shown in FIG. 19A, the second lower electrode 624 has a rectangular surface, and is formed so as to extend along the lateral direction of the first dielectric layer 611. One short side end part of the second lower electrode 624 is connected to the sixth external terminal 636. Incidentally, the extending length of the second lower electrode 624 is set such that the second lower electrode 624 is opposed to the second upper electrode 623 in a predetermined opposing area.

Figure 19B:
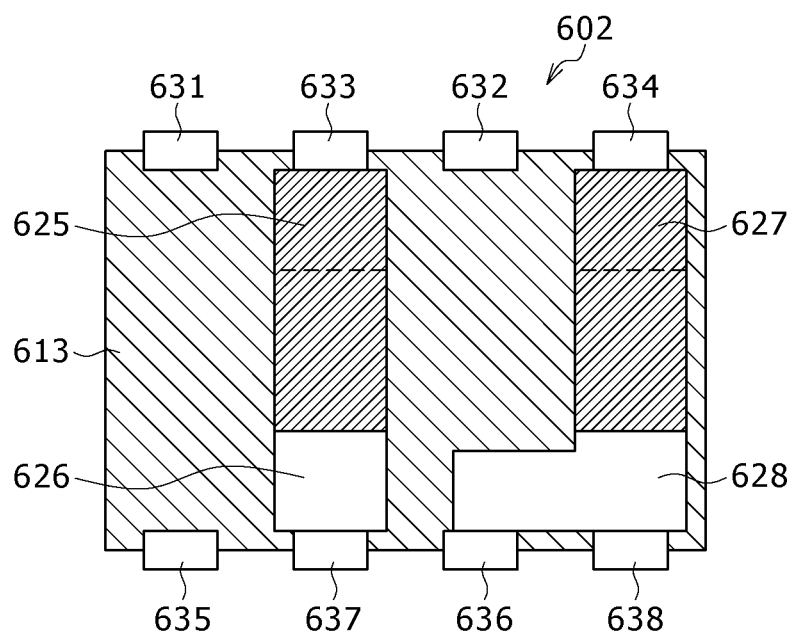
Figure 20:
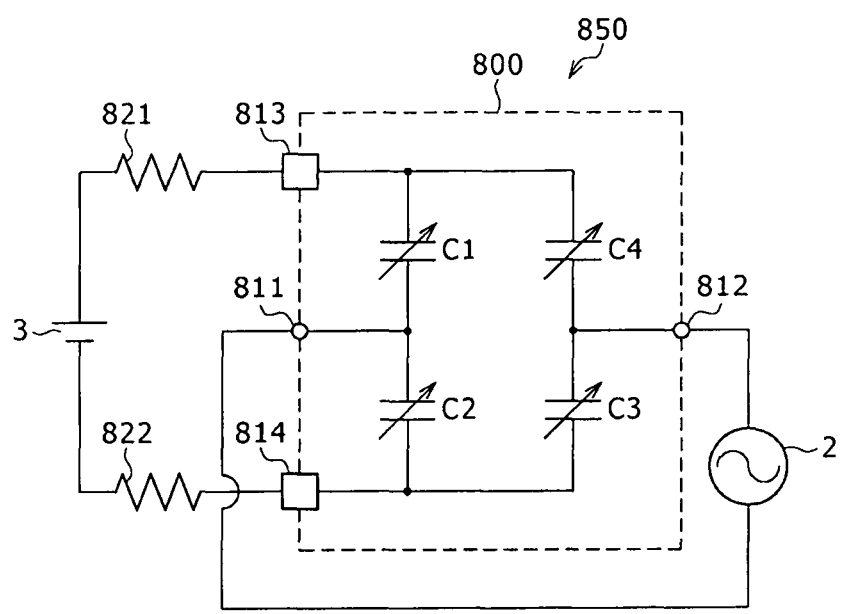
FIG. 20 shows an example of general configuration of a variable capacitance device in the past.

As shown in FIG. 19B, the third upper electrode 625 has a rectangular surface, and is formed so as to extend along a lateral direction of the third dielectric layer 613. One short side end part of the third upper electrode 625 is connected to the third external terminal 633. Incidentally, the extending length of the third upper electrode 625 is set such that the third upper electrode 625 is opposed to the third lower electrode 626 in a predetermined opposing area.

As shown in FIG. 19B, the third lower electrode 626 has a rectangular surface, and is formed so as to extend along the lateral direction of the third dielectric layer 613. One short side end part of the third lower electrode 626 is connected to the seventh external terminal 637. Incidentally, the extending length of the third lower electrode 626 is set such that the third lower electrode 626 is opposed to the third upper electrode 625 in a predetermined opposing area.

As shown in FIG. 19B, the fourth upper electrode 627 has a rectangular surface, and is formed so as to extend along the lateral direction of the third dielectric layer 613. One short side end part of the fourth upper electrode 627 is connected to the fourth external terminal 634. Incidentally, the extending length of the fourth upper electrode 627 is set such that the fourth upper electrode 627 is opposed to the fourth lower electrode 628 in a predetermined opposing area.

As shown in FIG. 19B, the fourth lower electrode 628 has an L-shaped surface. One side part of the fourth lower electrode 628 extends along a longitudinal direction of the third dielectric layer 613. Another side part of the fourth lower electrode 628 extends along the lateral direction of the third dielectric layer 613. In this example, one side part of the fourth lower electrode 628 which side part extends along the longitudinal direction of the third dielectric layer 613 is connected to the sixth external terminal 636 and the eighth external terminal 638.

Incidentally, the width of one side part of the fourth lower electrode 628 in a direction orthogonal to the extending direction of one side part of the fourth lower electrode 628 is made smaller than a shortest distance between the fourth upper electrode 627 and the eighth external terminal 638. Further, in this example, a part of the long side part on the third dielectric layer 613 side of the sixth external terminal 636 and one side part of the fourth lower electrode 628 are connected to each other.

The other side part of the fourth lower electrode 628 extends from the eighth external terminal 638 to the fourth external terminal 634. The extending length of the other side part of the fourth lower electrode 628 is set such that the fourth lower electrode 628 is opposed to the fourth upper electrode 627 in a predetermined opposing area.

When each internal electrode is connected as described above, the second external terminal 632 and the third external terminal 633 are common terminals, the fifth external terminal 635 and the seventh external terminal 637 are common terminals, and the sixth external terminal 636 and the eighth external terminal 638 are common terminals. As a result, a series circuit in which the first capacitor 641, the third capacitor 643, the second capacitor 642, and the fourth capacitor 644 are connected in series with each other in this order is formed within the variable capacitance device 600.

Consideration will now be given to for example a case where the second capacitor 642 and the third capacitor 643 are used as variable capacitance capacitors and the first capacitor 641 and the fourth capacitor 644 are used as DC removing capacitors in the above-described constitution. In this case, the second external terminal 632 and the third external terminal 633, the fifth external terminal 635 and the seventh external terminal 637, and the sixth external terminal 636 and the eighth external terminal 638 are each connected to a control power supply. At this time, the second external terminal 632 and the third external terminal 633, the fifth external terminal 635 and the seventh external terminal 637, and the sixth external terminal 636 and the eighth external terminal 638 are each connected to the control power supply such that the second capacitor 642 and the third capacitor 643 are connected in parallel with each other. The first external terminal 631 and the fourth external terminal 634 are connected to an alternating-current power supply.

As described above, in this example, two capacitors are formed in each dielectric layer. However, spaces between the internal electrodes and between the external terminals can be increased as compared with the existing variable capacitance device described with reference to FIGS. 21A and 21B, for example. Thus, the variable capacitance device 600 in this example also provides similar effects to those of the foregoing embodiment.

Incidentally, in the above-described sixth example of modification, description has been made of an example in which a plurality of capacitors are connected in series with each other by establishing connection between internal electrodes. However, the present application is not limited to this. For example, the plurality of capacitors may be connected in series with each other by establishing connection between external terminals (see FIGS. 21A and 21B), or the plurality of capacitors may be connected in series with each other by establishing connection between internal electrodes and between external terminals as appropriate. A method of connecting the plurality of capacitors is selected appropriately in consideration of the size of the variable capacitance device and effects of parasitic capacitance, for example.

In the foregoing embodiment and the various examples of modification, description has been made of examples of constitution where four to six capacitors are formed and connected in series with each other in one variable capacitance device. However, the present application is not limited to this. Three or seven or more capacitors may be formed and connected in series with each other in one variable capacitance device. However, when three capacitors are formed in one variable capacitance device, all the capacitors are used as variable capacitance capacitors, and DC removing capacitors are prepared separately, as in the second example of modification.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A variable capacitance device comprising:
    a device body comprising:
        a plurality of dielectric layers formed by a dielectric material changing in capacitance according to a control signal applied externally and laminated in a predetermined direction, wherein the dielectric layers have a length that extends along a longitudinal direction; and
        an internal electrode section including at least one internal electrode formed in each of both surfaces of each dielectric layer, wherein the at least one internal electrode comprises a first internal electrode having its length aligned in a lateral direction, wherein a second internal electrode whose a length is aligned with the longitudinal direction so that the first and second internal electrodes have areas of non-overlapping surface areas, and wherein the lateral direction is different from the longitudinal direction,
    three or more capacitors being formed by said plurality of dielectric layers and said internal electrode section, and the three or more capacitors being connected in series with each other; and
    at least three control terminals supplied with said control signal, and respectively arranged for at least three said internal electrodes forming at least two capacitors of said three or more capacitors, wherein the at least three control terminals are connected to the three or more capacitors that are connected in series with each other.

2. The variable capacitance device according to claim 1, wherein said internal electrode section is formed by one said internal electrode, and one said capacitor is formed in each of said plurality of dielectric layers.

3. The variable capacitance device according to claim 1, wherein said capacitor situated at an utmost end of a series circuit including said three or more capacitors is formed by a capacitor group including a plurality of capacitors connected in parallel with each other.

4. The variable capacitance device according to claim 1, wherein said variable capacitance device includes a plurality of device bodies where each of said device bodies corresponds to said device body, the plurality of said device bodies are laminated in said predetermined direction, and corresponding internal electrodes are connected to each other between the plurality of said device bodies such that the plurality of said device bodies are connected in parallel with each other.

5. The variable capacitance device according to claim 4, wherein said internal electrode of one device body of two adjacent device bodies and said internal electrode of another device body, said internal electrodes being opposed to each other at a boundary between the two adjacent said device bodies, are said corresponding internal electrodes, and are connected to each other.

6. The variable capacitance device according to claim 1, wherein said control terminals are respectively arranged for all of said internal electrodes forming said three or more capacitors, and said three or more capacitors are all used as variable capacitance capacitors.

7. The variable capacitance device according to claim 1, wherein said internal electrode section is formed by a plurality of internal electrodes, and a plurality of capacitors are formed in each dielectric layer.

8. The variable capacitance device according to claim 1, further comprising at least three direct current removing resistances or inductors respectively connected to said at least three control terminals.

9. The variable capacitance device according to claim 1, wherein the three or more capacitors comprise five capacitors and all five of the capacitors are all variable capacitors.

10. The variable capacitance device according to claim 1, wherein all of the three or more capacitors are all variable capacitors, and
    external DC removing capacitors are used to connect an alternating-current power supply.

11. The variable capacitance device according to claim 1, wherein the at least three control terminals are disposed on a plurality of side of the device body.

12. The variable capacitance device according to claim 1, wherein the at least three control terminals are disposed on at least three sides of the device body.

13. The variable capacitance device according to claim 1, wherein the at least three control terminals are disposed on each side of the device body.

14. The variable capacitance device according to claim 1, further comprising two external terminals externally supplied with an input signal and respectively connected with two said internal electrodes so that the two external terminals are situated at utmost ends in said predetermined direction within said device body.

* * * * *